(12) United States Patent
Jin

(10) Patent No.: US 10,305,781 B2
(45) Date of Patent: May 28, 2019

(54) CONTENT CENTRIC CROSS-LAYER SCHEDULING FOR INDUSTRIAL APPLICATIONS

(71) Applicant: KABUSHIKI KAISHA TOSHIBA, Tokyo (JP)

(72) Inventor: Yichao Jin, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 15/240,445

(22) Filed: Aug. 18, 2016

(65) Prior Publication Data
US 2018/0054380 A1 Feb. 22, 2018

(51) Int. Cl.
| | |
|---|---|
| *H04L 12/721* | (2013.01) |
| *H04L 12/751* | (2013.01) |
| *H04W 28/02* | (2009.01) |
| *H04W 72/12* | (2009.01) |
| *H04L 29/08* | (2006.01) |
| *H04W 4/20* | (2018.01) |
| *H04W 4/80* | (2018.01) |
| *H04L 5/22* | (2006.01) |
| *H04W 84/18* | (2009.01) |

(52) U.S. Cl.
CPC .............. *H04L 45/12* (2013.01); *H04L 45/02* (2013.01); *H04L 67/325* (2013.01); *H04W 4/20* (2013.01); *H04W 28/0268* (2013.01); *H04W 72/1263* (2013.01); *H04L 5/22* (2013.01); *H04W 4/80* (2018.02); *H04W 84/18* (2013.01)

(58) Field of Classification Search
CPC .......... H04L 45/12; H04L 45/02; H04L 5/22; H04W 28/0268; H04W 72/1263; H04W 4/008
See application file for complete search history.

(56) References Cited

U.S. PATENT DOCUMENTS

| | | | |
|---|---|---|---|
| 2015/0109926 A1* | 4/2015 | Jin | ........................ H04W 40/22 370/235 |
| 2016/0021017 A1* | 1/2016 | Thubert | .................. H04L 47/28 370/235 |

\* cited by examiner

*Primary Examiner* — Jae Y Lee
(74) *Attorney, Agent, or Firm* — Finnegan, Henderson, Farabow, Garrett & Dunner, L.L.P.

(57) ABSTRACT

Arrangements described herein implement a CONtent CentrIc cross-layer SchEduling (CONCISE) approach in which content specific routes and schedules are created, resulting in an overlaid routing structure and multiple content based schedules. In CONCISE, not only is non-conflict multi-hop scheduling implemented but also data aggregation along the routing path is taken into account during the scheduling process. This therefore provides a new way to route and aggregate data in a deterministic and timely manner via scheduling.

23 Claims, 14 Drawing Sheets

Network topology optimized by congestion analyzer and path optimizer

Network topology without x-layer interaction between CRM & CSM

CONTENT CENTRIC CROSS-LAYER SCHEDULING FOR INDUSTRIAL APPLICATIONS

TECHNICAL FIELD

The present disclosure relates to network management devices and methods for managing transmissions over a multi-hop wireless network. In particular, but without limitation, the present disclosure relates to scheduling systems based on Time Slotted Channel Hopping Medium Access Control (TSCH MAC) and for IEEE 802.15.4e networks.

BACKGROUND

Low latency and high reliability have always been the key requirements for industrial applications such as factory automation, power and energy system monitoring and control, smart metering, and oil and gas businesses. In the past, such industrial control systems have included a large number of cables in order to connect, monitor and control the array of devices and sensor units across an industrial plant. It can be quite expensive to install, operate and maintain such a wired system. Despite these disadvantages, the industry is still reluctant to switch to cheaper wireless internet of things (IoT) solutions which have been on the market for the past few years.

The IEEE 802.15.4 standard specifies the physical layer and media access control (MAC) layer for low-rate wireless personal area networks, such as those used in industrial applications. Previous IEEE 802.15.4 standard solutions, whilst being cheaper, have not been able to deliver the desired low-latency and high reliability requirements due to their carrier sense multiple access with collision avoidance (CSMA/CA) based contention MAC access methods.

Time Division Multiple Access (TDMA) scheduling is an alternative to CSMA/CA. TDMA splits time into small intervals called timeslots. Each individual node in the network is assigned with a schedule (a set of timeslots), in which they can transmit data on a channel (e.g. a certain frequency bandwidth) without collision with other transmissions. Since TDMA is contention-less and collision free, it can achieve much lower multi-hop latency and higher communication reliability compared with CSMA/CA based approaches. Having said this, it still suffers from multi-path fading and interference from other devices in the Industrial, Scientific and Medical Radio (ISM) band such as WiFi, Bluetooth and microwave devices, to name a few.

To overcome these limitations, the Time-Slotted Channel Hopping (TSCH) MAC provides a promising way to enable deterministic mesh networking and paves the way for future low-power wireless industrial applications (the Internet of Important things). TSCH achieves improved communication reliability via channel hopping and avoids external interference operating at the same frequency band. Channel hopping helps to spread the risk of collisions by periodically switching the channel over which transmissions are made. TSCH also maintains low radio duty cycle and low energy consumption by synchronizing network nodes.

The Internet Protocol version 6 over the TSCH MAC (6TiSCH) standard is a developing Internet Engineering Task Force (IETF) standard. Along with a scheduling mechanism to enable deterministic wireless communication, it can provide ultra-low latency and high reliability guarantee for industrial applications.

Although the current 6TiSCH standard defines the mechanism of how the TSCH MAC executes a TDMA schedule in a network, it does not specify how to build an optimized schedule. It is not an easy task to find an optimal schedule in multi-hop, low power wireless networks.

Industrial applications can have varying latency demands. For example, process control or monitoring applications (e.g. environmental monitoring) can be non-time critical. On the other hand, factory automation, disaster defence and safety applications can be highly sensitive to delays. Thus, the latency and system response time of such applications is important and the Quality of Service (QoS) requirements are often in the scale of hundreds of milliseconds.

In addition, wireless network nodes are often powered by batteries with limited capacity. As such, power efficiency should be maximised and unnecessary power usage within devices should be minimised.

BRIEF DESCRIPTION OF THE DRAWINGS

Arrangements of the present invention will be understood and appreciated more fully from the following detailed description, made by way of example only and taken in conjunction with drawings, in which.

DETAILED DESCRIPTION

Figure 1A:
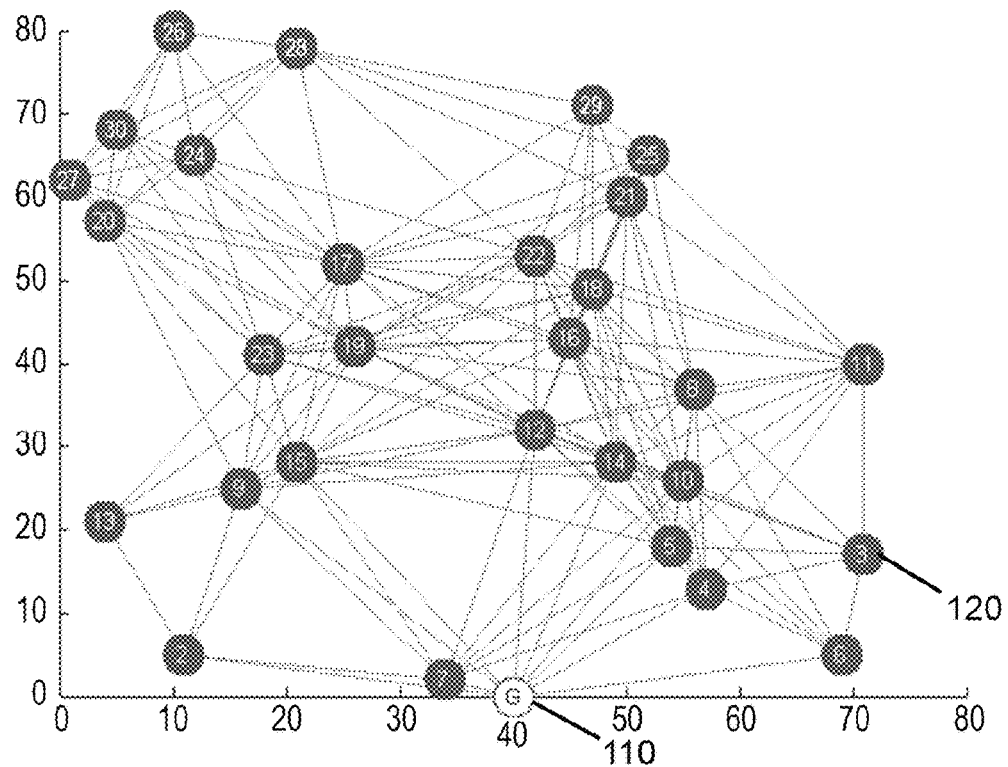
FIG. 1(a) shows a network topology for a local wireless network.

According to a first arrangement there is provided a network management device for managing transmissions over a multi-hop wireless network, the network comprising nodes wherein one or more of the nodes are configured to generate one or more messages for communication across the network, each of the messages comprising data of one of a plurality of data types, wherein messages having data of the same data type are capable of being aggregated by a node so as to reduce the number of bits required to send the data over the network. The device comprises a controller and an interface configured to communicate with one or more nodes in the network. The controller is configured to receive network information relating to the topology of nodes in the network, receive traffic information detailing rates that the one or more of the nodes generate messages, and the data type of the data contained in each of the generated messages, and determine a respective routing topology for each data type based on the network information and based on the traffic information for messages of the respective data type. The controller is further configured to determine, for each data type, a respective communication schedule for transmitting messages containing the respective data type across the network based on the routing topology for the respective data type, the communication schedule including one or more processing tasks for aggregating data of the respective data type, and send, via the interface, the communication schedules to the network to allow the nodes to send messages according to the communication schedules.

Arrangements therefore assign content-specific schedules to allow data of the same content type to be aggregated and routed effectively through the network to avoid bottlenecks.

The interface could be wireless or wired. Accordingly, the network management device may be a node within the network or may be connected to a node within the network as part of a back end management system. Any communication by the network management device could therefore be directly with the network or via an intermediate network/device, for instance, via the internet.

Each communication schedule is a content specific communication schedule. Sending the communication schedules could include forming a combined schedule for all types of data. Sending the communication schedules could further include dividing the combined schedule into node specific schedules and sending the node specific schedules to the respective nodes. Alternatively, all of the schedules (or a combined schedule) could be sent to each node in the network.

Each type of content may relate to data that is for use by a respective application. By assigned content types based on application, this ensures that data can be effectively aggregated.

According to a further arrangement the network comprises a hub node, messages are transmitted via a number of communications links between nodes in order to be sent to the hub node, the network comprises a number of layers based on the number of communications links between the nodes and the hub node, and determining, for each data type, a respective routing topology comprises for each node in each layer assigning a communications link between the node and a relay node selected from a plurality of neighbouring candidate nodes that are one layer closer to the hub node than the node, wherein the relay node is selected based on the number of nodes neighbouring each candidate node that receive, transmit and/or aggregate data of the respective data type.

By assigning communications links based on the number of nodes neighbouring each candidate node, a network topology can be formed for each content type that provides improved aggregation. The assignment of communications links may begin at the outer layer of the number of layers and move, layer by layer, towards the hub node. Layers may be determined based on shortest path to hub node and/or link quality. For instance, each layer may comprise nodes that have the same minimum hop distance to hub node.

The relay node may be determined to be the candidate node that has the most neighbouring nodes that receive, transmit and/or aggregate data of the respective data type.

In one arrangement the controller is configured to, for each data type, determine, based on the routing topology for the respective data type, one or more aggregation nodes for aggregating data of the respective data type, and determine data rates across communication links in the routing topology, wherein the data rates are determined based on the routing topology for the respective data type and the one or more aggregation nodes for the respective data type. Determining, for each data type, a respective communication schedule comprises scheduling one or more processing tasks for each of the aggregation nodes for the respective data type. Aggregation and data rates could be computed in routing or scheduling.

The controller may be further configured to, for each data type, determine a bottleneck node in the network based on the schedule for the respective data type, determine a new routing topology that reduces the number of scheduled transmissions and/or processing tasks assigned to the bottleneck node, and determine a new schedule based on the new routing topology. This allows the topology to be improved to avoid congestion points. In other words, the routing and scheduling is repeated using same method as described above but reducing the traffic through bottleneck nodes. More than one bottleneck node may be identified.

The bottleneck node may be determined based on the number of scheduled transmissions and/or processing tasks assigned to each node in the network. This could be the number of transmissions and/or processing tasks relative to total number of transmissions and/or processing tasks. For instance, a node may be determined to be a bottleneck node if it has more than a predefined number of transmissions and/or processing tasks relative to the total number of transmissions and/or processing tasks. Alternatively, a predefined number of nodes that have the most scheduled transmissions and/or processing tasks may be determined to be bottleneck nodes.

In one arrangement the controller is configured to determine whether the new schedules provide a shorter overall schedule than the communication schedules and, if so, update the communication schedules to reflect the new schedules. Shorter overall schedule may mean that the longest of the new schedules is shorter than the longest of the communication schedules, or that a combined schedule formed from the new schedules is shorter than a combined schedule formed from the communication schedules. The choice of whether to update communication schedules could also be based on other factors such as power or network efficiency. Updating the communication schedules could comprise replacing the previous communication schedules with the new schedules. The updated communication schedules may be sent to the network or may be further optimised, as discussed above. Accordingly, further new schedules could be determined until a shorter schedule cannot be found (e.g. after a predefined number of (failed) attempts).

Determining a new routing topology could comprise reassigning one or more communication links from the bottleneck node of one of the data types to a different node. The one of the data types may be the least important data type, determined based on a predefined importance ranking. The importance ranking may be, at least in part, assigned based on the respective applications associated with the data types.

The different node may be the candidate node with the next highest number of neighbouring nodes that transmit and/or aggregate data of the respective data type.

In one arrangement each communication schedule assigns one or more priority transmission timeslots in which time critical messages take priority. This allows important messages to be transmitted quickly, whilst still providing an efficient system via scheduled transmission and aggregation. If no time critical messages are to be sent, the nodes may compete for use of the priority transmission cell.

In one arrangement, the communication schedules are suitable for use with time slotted channel hopping medium access control (TSCH MAC). Accordingly, the nodes may implement the schedule using TSCH MAC. A combined schedule formed from all of the communication schedules may be suitable for TSCH MAC. Furthermore, node specific schedules may be formed from the communication schedules, with each node specific schedule being suitable for use with TSCH MAC.

One arrangement comprises the device and network described above.

According to a further arrangement there is provided a method for managing transmissions over a multi-hop wireless network, the network comprising nodes wherein one or more of the nodes are configured to generate one or more messages for communication across the network, each of the messages comprising data of one of a plurality of data types, wherein messages having data of the same data type are capable of being aggregated by a node so as to reduce the number of bits required to send the data over the network. The method comprises a network management device receiving network information relating to the topology of nodes in the network receiving traffic information detailing rates the one or more of the nodes generate messages, and the data type of the data contained in each of the generated messages, and determining a respective routing topology for each data type based on the network information and based on the traffic information for messages of the respective data type. The method further comprises the network management device determining, for each data type, a respective communication schedule for transmitting messages containing the respective data type across the network based on the routing topology for the respective data type, the communication schedule including one or more processing tasks for aggregating data of the respective data type, and sending the communication schedules to the network to allow the nodes to send messages according to the communication schedules.

In one arrangement the network comprises a hub node, messages are transmitted via a number of communications links between nodes in order to be sent to the hub node, the network comprises a number of layers based on the number of communications links between the nodes and the hub node, and determining, for each data type, a respective routing topology comprises for each node in each layer assigning a communications link between the node and a relay node selected from a plurality of neighbouring candidate nodes that are one layer closer to the hub node than the node, wherein the relay node is selected based on the number of nodes neighbouring each candidate node that receive, transmit and/or aggregate data of the respective data type.

In one arrangement the relay node is determined to be the candidate node that has the most neighbouring nodes that receive, transmit and/or aggregate data of the respective data type.

The method may further comprise, for each data type, determining, based on the routing topology for the respective data type, one or more aggregation nodes for aggregating data of the respective data type, and determining data rates across communication links in the routing topology, wherein the data rates are determined based on the routing topology for the respective data type and the one or more aggregation nodes for the respective data type. Determining, for each data type, a respective communication schedule may comprise scheduling one or more processing tasks for each of the aggregation nodes for the respective data type.

In one arrangement the method further comprises, for each data type, determining a bottleneck node in the network based on the schedule for the respective data type, determining a new routing topology that reduces the number of scheduled transmissions and/or processing tasks assigned to the bottleneck node, and determining a new schedule based on the new routing topology.

In one arrangement the bottleneck node is determined based on the number of scheduled transmissions and/or processing tasks assigned to each node in the network.

The method further may further comprise determining whether the new schedules provide a shorter overall schedule than the communication schedules and, if so, updating the communication schedules to reflect the new schedules.

In one arrangement determining a new routing topology comprises reassigning one or more communication links for a data type from the bottleneck node of one of the data types to a different node.

The different node may be the candidate node with the next highest number of neighbouring nodes that transmit and/or aggregate data of the respective data type.

In one arrangement each communication schedule assigns one or more priority transmission timeslots in which time critical messages take priority.

According to a further arrangement there is provided a non-transitory computer readable medium comprising computer executable instructions which, when executed by a network management device, cause the network management device to perform any of the methods described above.

According to a further arrangement there is provided a node for use in a multi-hop wireless network, wherein the node comprises a controller and a wireless interface for communication with nodes in the network. The controller is configured to transmit messages according to a schedule, wherein the schedule includes scheduled timeslots for the node and a priority timeslot during which time-critical messages take priority. If no time-critical messages have been received, then the controller is configured attempt to transmit using a contention based protocol during the priority timeslot. If a time-critical message has been received by the node and the time-critical message is for transmission by the node, then the controller is configured to transmit the time-critical message during the next available timeslot selected from the priority timeslot and the scheduled timeslots for the node. If a time-critical message has been received by the node and the time-critical message is not for transmission by the node, the controller is configured to wait at least until the priority timeslot has passed before resuming transmission.

According to a further arrangement there is provided a method for operating a node in a multi-hop wireless network. The method comprises the node transmitting messages according to a schedule, wherein the schedule includes scheduled timeslots for the node and a priority timeslot during which time-critical messages take priority. If no time-critical messages have been received, then the node attempts to transmit using a contention based protocol during the priority timeslot. If a time-critical message has been received by the node and the time-critical message is for transmission by the node, then the node transmits the time-critical message during the next available timeslot selected from the priority timeslot and the scheduled timeslots for the node. If a time-critical message has been received by the node and the time-critical message is not for transmission by the node, then the node waits at least until the priority timeslot has passed before resuming transmission.

It will be readily apparent that any of the above arrangements can be combined in any combination to implement the teaching described herein.

Arrangements described herein provide an improved means of managing transmission over multi-hop wireless networks. Multi-hop timeslot and channel allocation and scheduling to minimise latency and maximise reliability can be very challenging. The main problem is how to assign timeslots and channels in a way that they do not collide or interfere with each other. In the first case, a node should not transmit or receive at the same time or receive multiple messages designated to it at the same time. Secondly, interference may also occur when concurrent communications are transmitted within interference range of each other. Otherwise, spatial reuse of timeslots is possible. Different channel assignment to concurrent communications can also mitigate inter-network interference.

It is not an easy task to find an optimal schedule in multi-hop, low power wireless networks. Most of the scheduling algorithms only tackle the scheduling problem on the MAC layer with an assumption of having an optimal routing layer. Moreover, many routing topologies are not ideal for all purposes.

If processing is considered, both computation and communication jobs need to be scheduled properly, which further adds complexity to the NP-hard problem above. With centralized processing all raw data needs to first be sent to a sink node before being processed there. With distributed processing, any intermediate relay node can also compute and aggregate data within the network. But, often, a parent node has to receive all packets from its child nodes before a processing job can be executed. This is because conventional schedule approach only generates one routing topology and one schedule, which incurs additional waiting time if some data being relayed is not correlated. Therefore, it is desired to have a content-specific schedule for correlated communication and computation events. Furthermore, a node that is the best candidate for data aggregation purpose might not be the most suitable node for load balancing during the scheduling stage. Hence, a cross layer interaction (between the physical layer and the MAC layer) is also necessary.

Arrangements described herein implement a CONtent CentrIc cross-layer SchEduling (CONCISE) approach in which content specific routes and schedules are created, resulting in an overlaid routing structure and multiple content based schedules. In CONCISE, not only is non-conflict multi-hop scheduling implemented but also data aggregation along the routing path is taken into account during the scheduling process. This therefore provides a new way to route and aggregate data in a deterministic and timely manner via scheduling.

Significant network traffic reduction is a direct benefit of CONCISE, which can save limited resources, avoid traffic congestion, mitigate interference, reduce communication latency, and increase communication reliability. In addition, a content dependent immediate processing function and content independent premium timeslot reservation mechanism are proposed, offering an effective way to efficiently use processing and communication resources. Particularly, urgent messages (e.g. alarm or process failure messages) can be delivered rapidly across the network.

Results show that arrangements described herein can effectively reduce inner layer network traffic by 65%. As a result, they can provide a 50% reduction in delay compared to alternative 6TiSCH scheduling solutions without data aggregation. Arrangements also achieve almost 100% reliability in small scale networks and more than 99.5% packet delivery ratio when the number of nodes increases to 50.

FIG. 1(a) shows a network topology for a local wireless network. In the arrangement of FIG. 1(a), the wireless network comprises nodes 120 and a hub 110. Each node 120 is capable of communicating wirelessly with other nodes 120 (or the hub 110) within communication range. The hub 110 is also a wireless node, in that it is able to communicate wirelessly with nodes 120 within its transmission range. Each node 120 (including the hub 110) is assigned its own unique node identifier (node ID). The hub 110 is effectively the ultimate destination for all communications. That is, all transmissions in the network are directed through the network towards the hub 110, which acts as a data sink. Transmissions are forwarded through the network by intermediate (relay) nodes 120 via a multi-hop system. The hub 110 receives the forwarded messages and may be able to perform processes based on the transmissions or can forward on the messages to a central controller for further processing.

In the network topology shown in FIG. 1(a), communication links between nodes 120 or the hub 110 are shown as links between the respective nodes. That is, each node 110 is connected to each node 120 (or the hub 110) within its transmission range via a respective link. Equally the hub 110 is connected to all nodes 120 within its transmission range. As many nodes 120 are outside of transmission range from the hub 110, data may be transmitted to the hub 110 via intermediate nodes 120.

Data packets are sent from outer nodes 120 to nodes 120 closer to the hub 110, which in turn forward the data packets on to the hub 110 (if within range) or a further closer node 120. Each transmission from one node 120 to another is called a hop. The nodes 120 are divided up into layers based on their minimum hop distance to the hub 110.

The network topology graph can be modelled as $G(V,A)$, where V is a set of n vertices in G representing n nodes in the network $V=\{1,2,\ldots,n\}$. $A=\{a(i,j)|i,j \in V\}$ is a set of communication links $a(i,j)$ between node i and node j. If the distance between nodes i and j is greater than the communication range R then $a(i,j)=1$, otherwise $a(i,j)=0$.

Figure 1B:
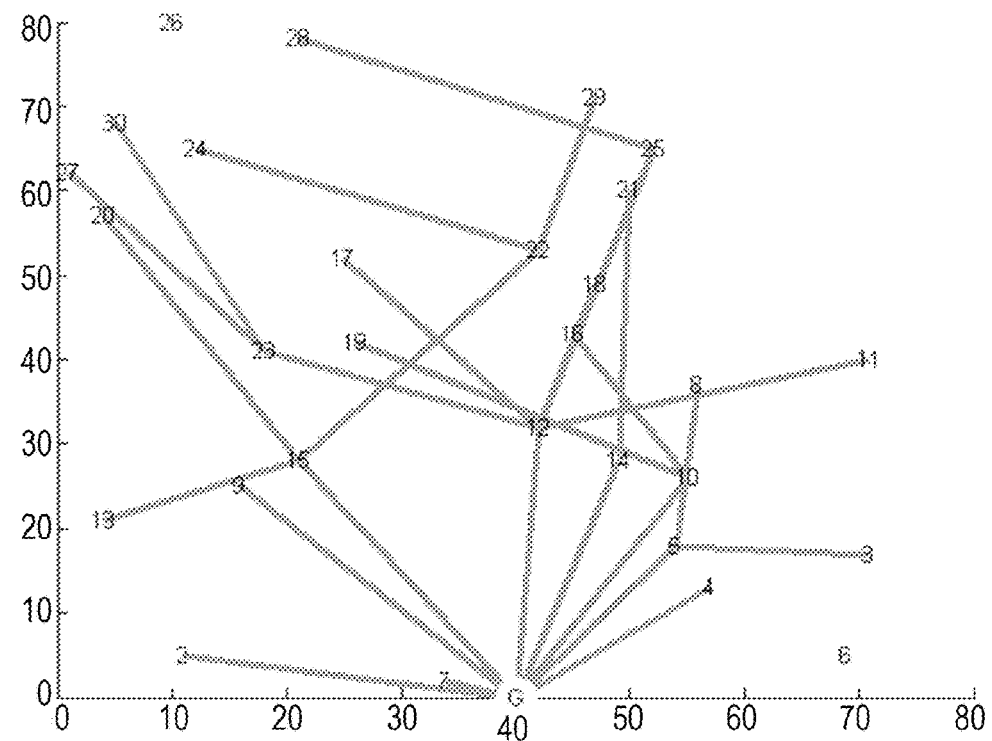
FIG. 1(b) shows a routing topology for the network topology of FIG. 1(a)

FIG. 1(b) shows a routing topology for the network topology of FIG. 1(a). The routing tree topology can be formed from the network topology and details dedicated communication links selected by a routing protocol. The routing may be based on the shortest path to the hub 110, link quality (e.g. the Routing Protocol for Low-Power and Lossy Networks, RPL), load balancing or expected transmission count (ETX). The routing tree converges on the hub 110.

The routing topology graph can be modelled as $T(V,E)$, where E is a subset of A ($E \in A$, $E=\{e(i,j)|i,j \in V\}$. A traffic topology $Gt(V,l(e(i,j)))$ can be formed from the routing topology, where $l(e(i,j))$ is the rate of traffic on link $e(i,j)$.

To avoid collisions between transmissions, a TDMA scheme is implemented. Accordingly, a schedule needs to be determined to specify when nodes 120 are permitted to transmit data.

Figure 2:
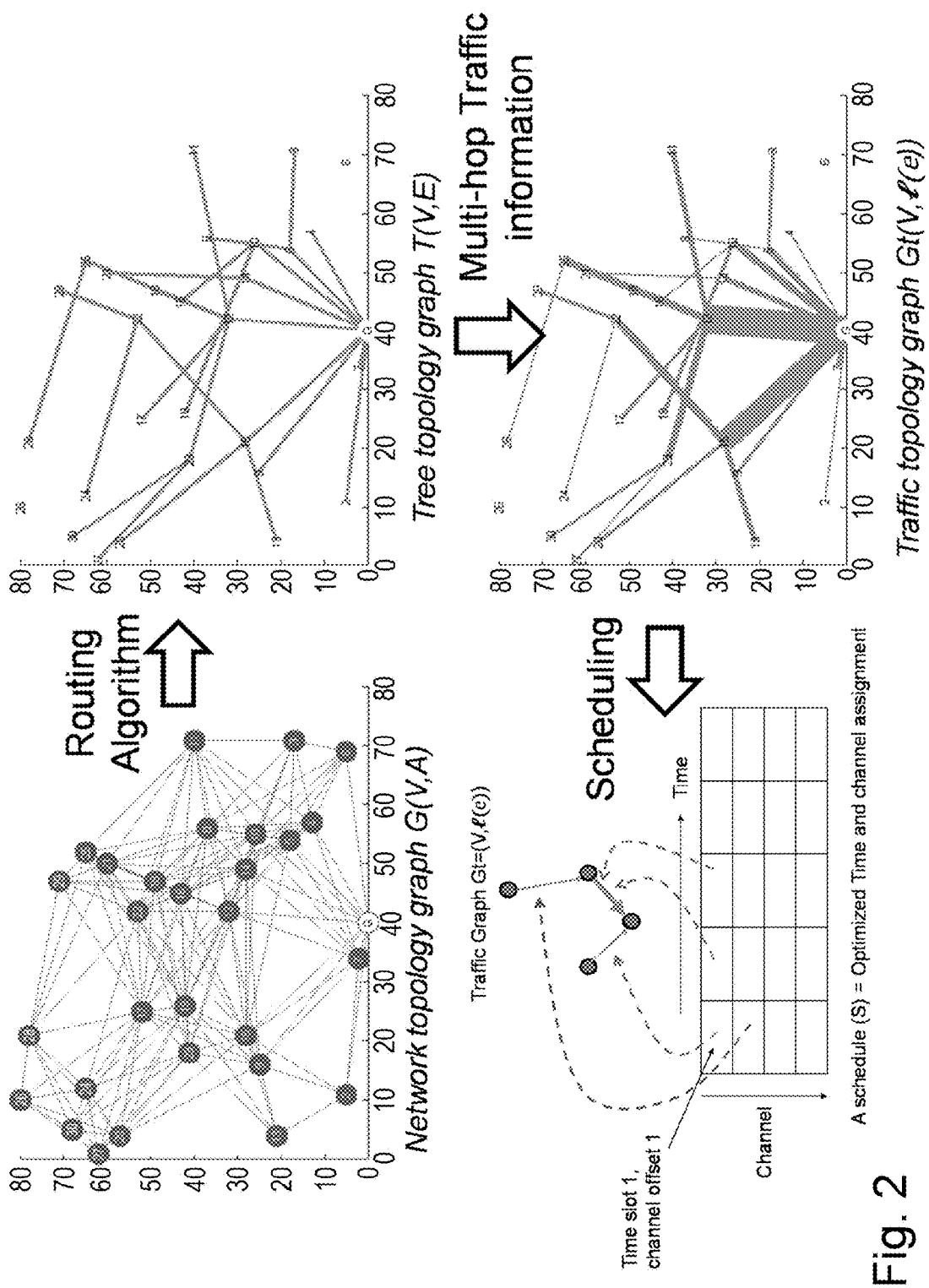
FIG. 2 shows a routing and scheduling process.

FIG. 2 shows a routing and scheduling process. Starting from the top left of the figure and going clockwise, the network topology graph $G(V,A)$ is received and then processed via a routing algorithm in order to determine an optimum routing topology graph $T(V,E)$. Nodes 120 are divided into layers (groups) $M_d \in V$ based on, for instance, the minimum hop distance d from the respective node 120 to the hub 110. That is, each layer may comprise nodes 120 having the same minimum hop distance to the hub 110. The determination of layers may also take into account link quality, so that certain nodes with a low link quality may be moved up one or more layers to avoid having a large number of nodes upstream (located in higher layers) routing towards the node with the low link quality.

Multi-hop traffic information is used to determine a traffic topology graph $Gt(V,l(e(i,j)))$ based on the routing topology graph $T(V,E)$. The traffic topology graph $Gt(V,l(e(i,j)))$ is then used to determine the scheduling for transmissions across the network. Scheduling assigns non-conflicting and interference free time-slots and channels to each link with respect to its traffic in such a way that certain objectives can be achieved (for example, low latency or high packet delivery ratio). The scheduling details when each node transmits along a given communication link and channel and what data is transmitted.

In many cases, data collected for the same application tends to be highly correlated and therefore can be combined or jointly processed by nodes 120 before being forwarded to the hub 110. For example, multiple sensor readings related to the same physical event may be fused together when received by a node 120. This type of data aggregation can reduce the total amount of messages to be sent over expensive wireless links, which has a significant improvement on energy consumption as well as overall network efficiency. On the other hand, uncorrelated packets might not be simply aggregated from the processing point of view, e.g. it is not meaningful to calculate an average of a temperature and a humidity reading. Accordingly, data is categorised based on the type of content in the data $C_k$, $k \in K$, where K is the total number of types of content in the network. Each type of content may correspond to a different application that may process the content.

As the aggregation process takes time, the schedule should include scheduled times to aggregate similar data. As only data of a similar content type can be aggregated, arrangements implement independent scheduling and transmission topology (selected routes for transmission to the hub 110) for each type of content.

In accordance with an arrangement, a CONtent CentrIc x-layer SchEduling (CONCISE) method is utilised in which a separate schedule consisting of both a centralized routing topology and a MAC schedule is created for each type of content, resulting an overlaid cross-layer schedule. CONCISE is a centralized cross-layer routing and scheduling algorithm, which runs on a central network control and management unit, referred as the network controller hereafter.

In this arrangement, the network topology graph is formed as in FIGS. 1 and 2; however, separate route and traffic topology graphs $Gt_{C_k}=(V,l_{C_k}(e(i,j)))$ are formed for each type of content $C_k$ based on the traffic rate $l_{C_k}(e(i,j))$ for the respective type of content across the network.

It is assumed that packets of the same content are able to be processed on intermediate relay nodes, while packets of different content types cannot be aggregated or processed. Accordingly, a dedicated buffer space $B_{C_k}$ is created in each node for each type of content $C_k$. Each intermediate relay node buffers all information received from its child nodes as well as its own generated data, if any, and then processes data stored in the corresponding content buffer when any one of the three conditions below is satisfied:

1) A content processing job $P_{C_k}$ is scheduled.
2) A content buffering limit is reached.
3) An immediate processing byte is decoded when a time-critical message is received.

During the processing stage, a processing node aggregates all information for the corresponding content. The output traffic rate $l_{C_k}e(i,j)$ after aggregation from the processing node i to the next hop node j depends on an application specific data aggregation ratio ω; however, it will be reduced relative to the output traffic rate without aggregation. A higher aggregation value w will result lower output traffic rate $l_{C_k}e(i,j)$ but will have a greater loss of raw data due to aggregation.

Figure 3A:
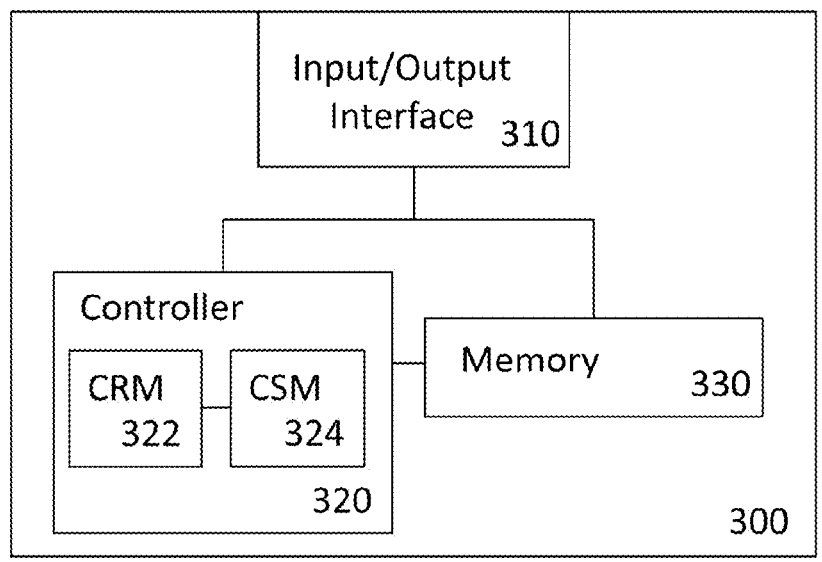
FIG. 3(a) shows a network controller for use in content based scheduling according to an arrangement.

FIG. 3(a) shows a network controller for use in content based scheduling according to an arrangement. The network controller 300 is a network management device for enacting the steps described herein to determine content based routes for traffic flow through the network and to determine content based schedules for the routes. The network controller comprises an input/output interface 310, a controller 320 and memory 330.

The input/output interface 310 is for receiving network statistics relating to the topology of the network and the traffic through the network.

The controller 320 is configured to determine the network topology from the network statistics and produce a content based schedule based on the traffic data and the network topology.

The controller 320 implements two modules, a content route manager (CRM) 322 and a content schedule manager (CSM) 324. The content route manager 322 generates a content dependent routing topology for each type of content. The content schedule manager 324 generates a content dependent schedule for each type of content based on the respective content dependent routing topology.

Memory 330 stores computer executable code which, when executed by the controller 320, causes the controller 320 to enact the steps described herein to produce and output a content based schedule. The network controller 300 may form part of or all of the hub or may be communicatively connected to the hub via a further (back-end) network.

Figure 3B:
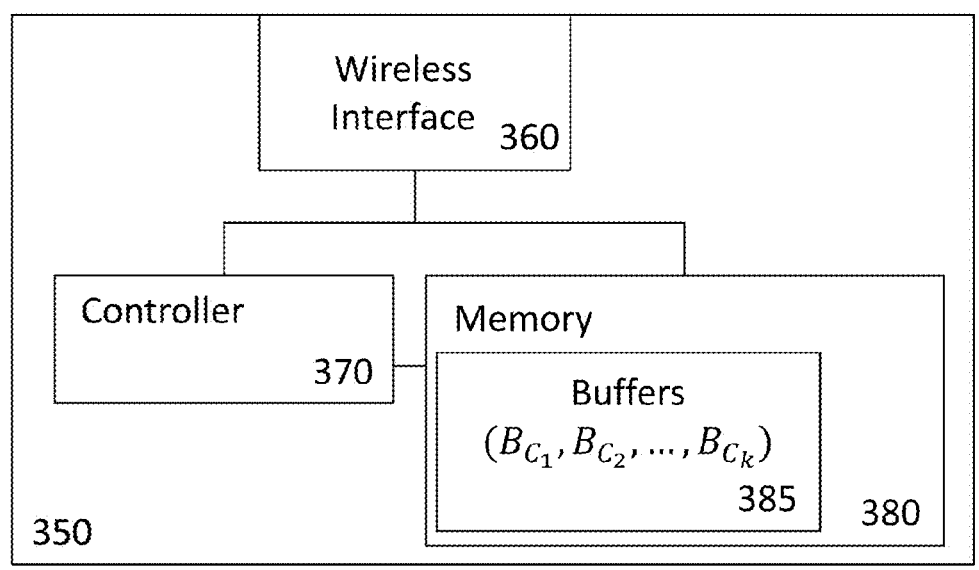
FIG. 3(b) shows a node according to an arrangement.

FIG. 3(b) shows a node according to an arrangement. The node 350 comprises a wireless interface 360, a controller 370 and memory 380. The wireless interface is configured to send and receive wireless signals to communicate with other wireless nodes. The controller 370 is configured to control the node to route data and aggregate data according to the methods described herein. The memory 380 stores computer executable code which, when executed by the controller 370, causes the controller 370 to enact the steps described herein to transmit, receive and process data. The memory 380 comprises buffers 385 for storing data of specific types of content. A respective buffer 385 ($B_{C_1}$, $B_{C_2}$, ..., $B_{C_k}$) is assigned to each type of content $C_k$.

The memory 380 is configured to store a schedule received from the network controller 300. The controller 370 is configured to transmit data via the wireless interface 360 to other nodes in the network according to the schedule. The controller 370 is configured to store messages received via the wireless interface 360 in the respective buffer 385 according to the type of content (the data type) of the data.

Figure 4:
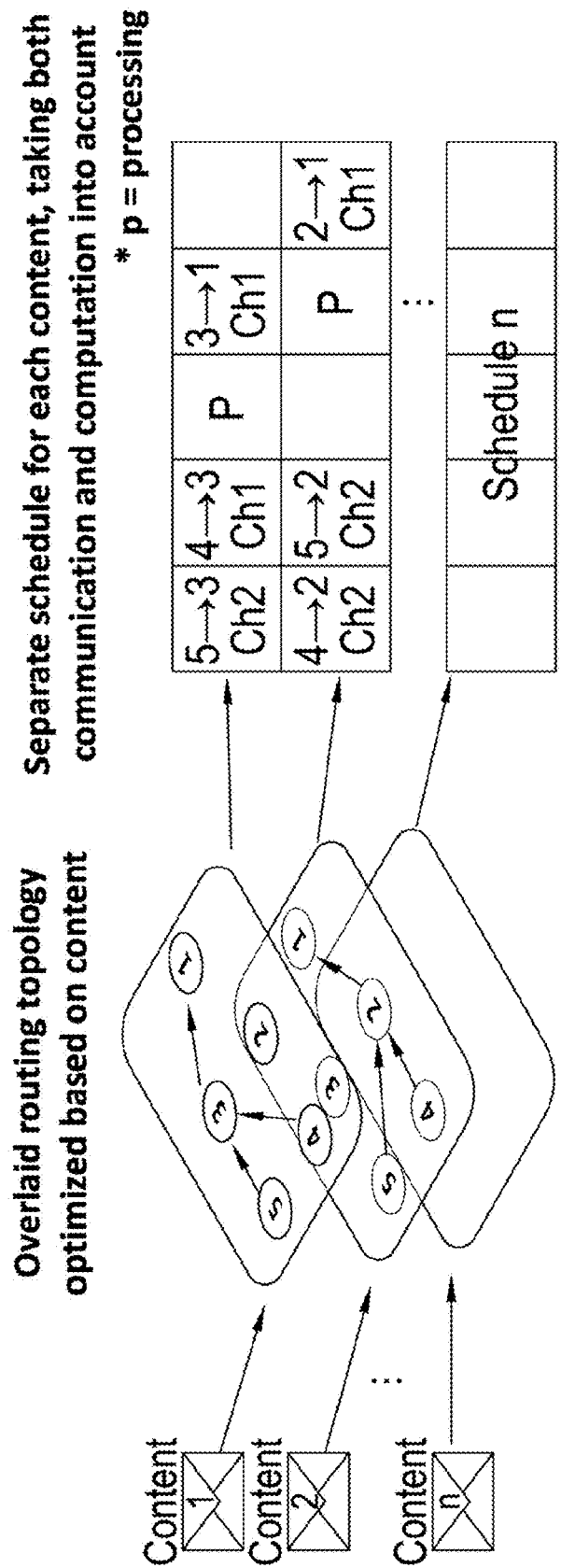
FIG. 4 shows content based routing and scheduling according to an arrangement.

FIG. 4 shows content based routing and scheduling according to an arrangement. Messages having different content types are routed, processed and scheduled independently. This forms an overlaid routing topology with each topology dedicated to one content flow with the aim of maximising network traffic reduction. In addition, multiple non-conflict schedules are also built based on different types of content. This means that as long as packets belong to the same content type, they can only be transmitted or processed in the assigned timeslot dedicated to the corresponding content, regardless of whether the packets are sent by the same node. To realize this, the content route manager (CRM) and content schedule manager (CSM) handle routing and scheduling respectively, and a joint optimization function is proposed to avoid network congestion and provide a balanced solution.

Content based routing is shown on the left-hand side of FIG. 4. Two types of content are transmitted through the network, a first type of content ("Content 1" shown by the upper routing topology) and a second type of content ("Content 2" shown by the lower routing topology). The network topology is the same for both content types. There are two nodes 5, 4 that are in a second (outer) layer, two hops away from the hub 1. There are two further nodes 3, 4 that are located in a first layer, in between the hub 1 and the second layer. Due to the separate routing topology for each type of content, the first type of content can be routed from nodes 4 and 5 to node 3, whilst the second type of content can be routed from nodes 4 and 5 via node 2. This allows nodes 2 and 3 to process the different types of content independently thereby speeding up transmission to the hub.

As shown in the right-hand side of FIG. 4, a schedule is assigned to each type of content. The schedules take into account both transmissions between nodes as well as processing by the nodes to aggregate content relating to the same content type. Different channels are utilised to allow concurrent transmissions between different pairs of nodes. The schedule does not, however, allow two transmissions to be made to the same node, and so separate timeslots are assigned for the transmissions from nodes 2 and 3 to the hub 1. This prevents collisions between the transmissions.

Figure 5:
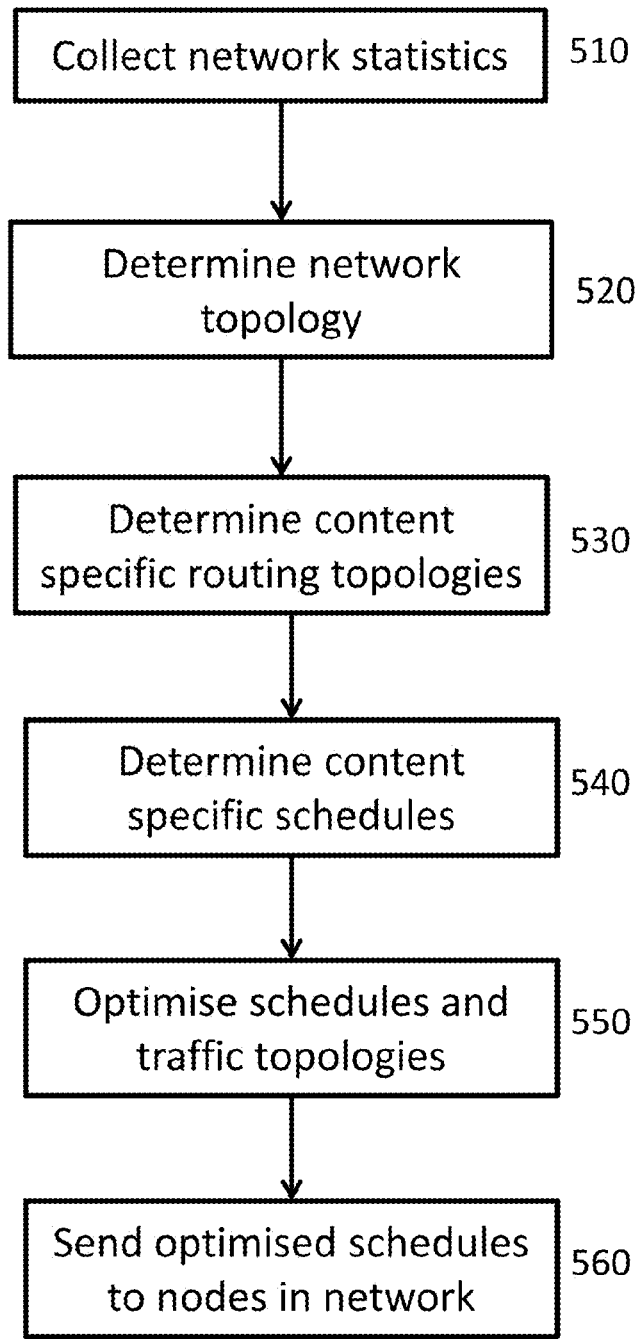
FIG. 5 shows an overview of a method for determining a content based schedule according to an arrangement.

FIG. 5 shows an overview of a method for determining a content based schedule according to an arrangement. Initially, the network controller gathers network statistics 510. The nodes in the network operate using a contention based scheme, e.g. CSMA, to collect network and traffic information and send this back to the network controller via signalling messages. The network statistics include an identification of which nodes are within transmission distance of each other, as well as the types of content $C_k$ and the traffic rate for each type of content $R_{C_k}$. The network statistics are used to determine the network topology G(V,A) of the network 520.

The traffic data relating to specific types of content is used to determine a content specific routing topology for each type of content based on the network topology 530. This shall be described in more detail below; however, the method utilises a centralized heuristic routing algorithm in order to discover a routing tree based on content and aggregate correlated content data along the multi-hop routing path such that the network traffic can be reduced. The content specific routing topology is therefore formed to include content specific aggregation points. The aim is to find the most effective content dependent aggregation points when routing data towards the sink to achieve a high traffic aggregation ratio.

Once a content specific routing topologies has been determined for each type of content, a content specific schedule is determined 650 for each type of content based on the respective traffic topology. This is based on the traffic rates for the specific content at the nodes within the network, as well as the aggregation points that are required by the content specific routing topology. Accordingly, the schedule includes not only the times for transmission but also times for aggregation of data by the nodes.

As certain routing topologies may cause bottlenecks due to a large number of messages being routed through a small number of nodes, an optimisation step 550 is included to iteratively test alternative routing topologies to see if an improved set of schedules can be produced. This involves determining congestion points in the network and optimising the routing topology to avoid these congestion points. The aim of this step is to find the routing topology that produces the shortest overall schedule (smallest time between beginning of the set of schedules and the end of the schedules).

Once a set of optimised schedules has been determined, this is output to the nodes in the network 560. This may be achieved by forming a combined schedule, combining all of the processes scheduled in the content specific schedules. As each node only requires its own schedule (does not need to know what the other nodes are doing), the schedule can be divided up into node specific schedules which are provided to the nodes, e.g. via the hub.

The allocation of content specific routing topologies and content specific schedules may be implemented by the network controller shown in FIG. 3. The method uses two modules, the content route manager (CRM) and the content schedule manager (CSM), both of which are implemented by the controller of the network controller. The content route manager determines the content specific routing topologies and the content schedule manager determines the content specific schedules.

The Content Route Manager (CRM)

Figure 6:
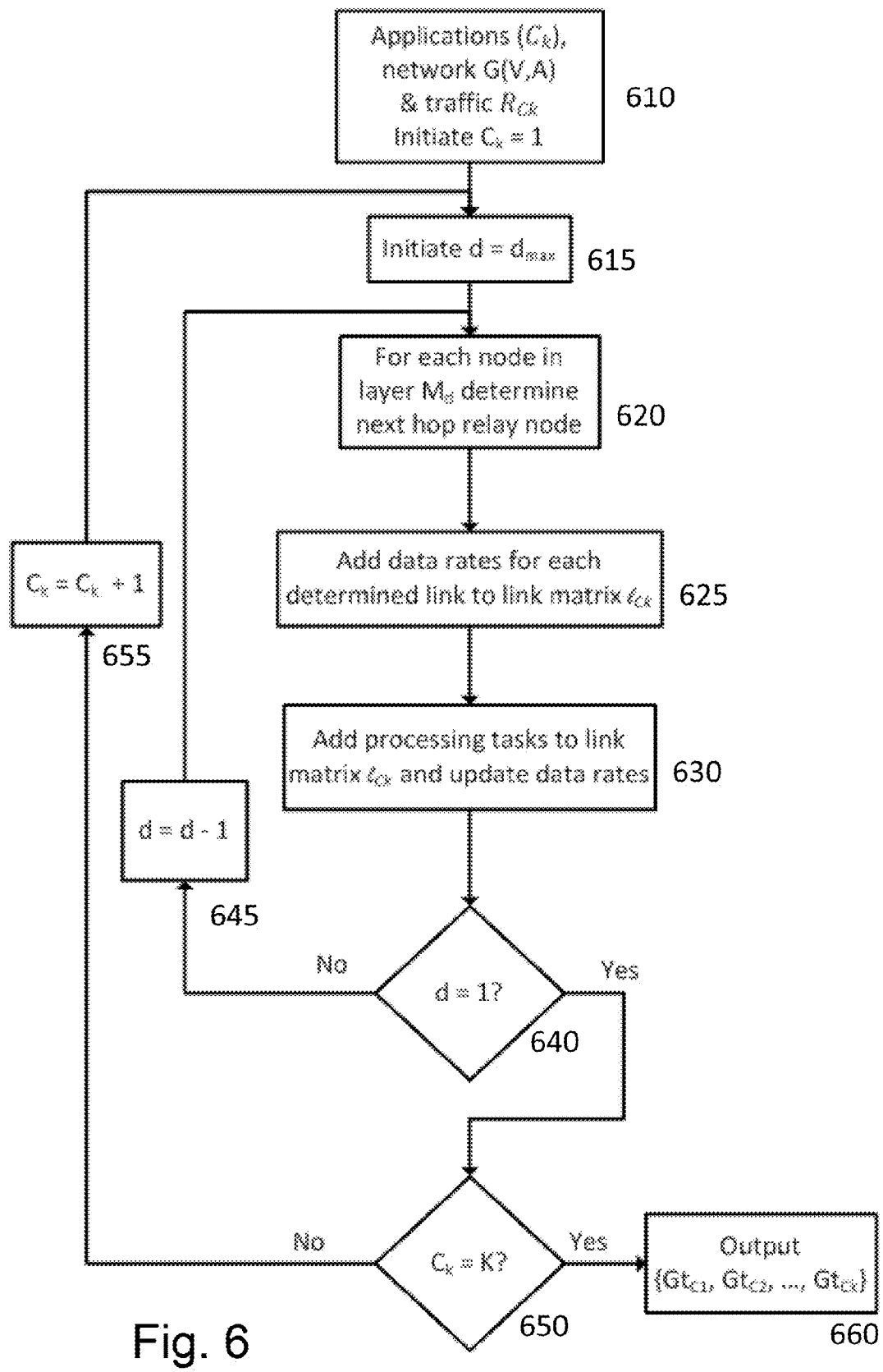
FIG. 6 shows a method of determining content specific routing topologies according to an arrangement.

FIG. 6 shows a method of determining content specific routing topologies according to an arrangement. The method, otherwise known as a content centric route finder, begins by receiving 610 the list of types of content (applications) $C_k$, the network topology G(V,A) and content specific traffic rates $R_{C_k}$ and initially selecting a first content type ($C_k$=1).

The method utilises two types of node relative to a given (target) node:
1. One hop neighbour—neighbouring nodes that are within one-hop distance from the target node, including the target node itself. If the target node is at layer $M_d$ then one hop neighbours can be at layer $M_{d+1}$, $M_d$, $M_{d-1}$.

2. Next hop neighbour—neighbouring nodes that are one-hop away from the target node with a smaller layer number. For example, if the target node is at layer $M_d$, next hop neighbours only can be in layer $M_{d-1}$.

The sequence to form the routing tree is based on the deceasing order of the hop distance layers ($M_{d_{max}}$, $M_{d_{max}-1}$, . . . , $M_1$). Accordingly, the nodes in the outer layer $M_{d_{max}}$ have their next hop neighbour relay nodes assigned first. A counter d is therefore initiated at (initially set to) $d_{max}$ 615.

For each node i in layer $M_d$ the next hop relay node (referred to as BestNode in Algorithm 1, below) is determined 620.

The next hop relay node is found to be the next hop neighbouring node at layer $M_{d-1}$ that has the most one-hop neighbours that have messages of content type $C_k$. A node that is said to "have" messages of a specific content type either generates the content of that type (is a source node) or processes and/or relays content of that type. Accordingly, the next hop relay node is the next hop neighbouring node at layer $M_{d-1}$ that has the most one-hop neighbours that transmit messages of content type $C_k$.

Each time a next hop relay node is found, it is added to a next hop relay list $\Gamma_{M_d}$. This allows the method to keep track of which nodes may perform data aggregation.

In addition, a content index is maintained for each node. The content index lists whether or not each node stores, processes and/or routes data for each type of content (i.e. if $R_{C_k}(n)>0$, then ContentIndex(n, $C_k$)=true). Each time a next hop relay node is assigned, the content index for the given content type $C_k$ for the next hop relay node is set to true (e.g. set to one, where zero indicates false) to account for the addition of the next hop relay node to the routing topology for content type $C_k$.

When each link is assigned in the layer $M_d$, the link is added to a content specific routing topology matrix $Gt_{C_k}$ 625. $Gt_{C_k}$ is formed from a link matrix $l_{C_k}$ and the node IDs of the nodes with content type $C_k$. The matrix $l_{C_k}$ is a 3-by-m matrix, where m is the number of communications links in the routing topology. Each column of the matrix relates to a single communications link. For each communications link, the top row specifies the transmitting node ID, the second row specifies the receiving node ID and the bottom row specifies the traffic rate (the data rate over the link).

To form this, a traffic matrix is originally constructed for each content type. The traffic matrix is a schedule sequence (SS) matrix showing the scheduled data being generated at each node. This may be constructed in advance of the method of FIG. 6, or may be provided as the traffic information in step 610. The traffic matrix is a 2-by-n' matrix where n' is the total number of source nodes that are generating packets (as opposed to total number of nodes n, which includes nodes that don't generate data but relay data).

The completed SS matrices for the network and content types of FIG. 4 are as follows:

$$SS_1 = \begin{bmatrix} 5 & 4 \\ 1 & 1 \end{bmatrix} \begin{matrix} \text{node} \\ \text{traffic} \end{matrix}$$

$$SS_2 = \begin{bmatrix} 5 & 4 \\ 1 & 1 \end{bmatrix} \begin{matrix} \text{node} \\ \text{traffic} \end{matrix}$$

The first row represents the node ID and the second row designates the data rate of packet generation at the node.

As links (i.e. next hop relay nodes) are assigned, the SS matrix can be expanded into a content specific link matrix $l_{C_k}$ through the addition of a central row relating to the receiving node IDs. Alternatively, a new matrix can be constructed based on the information on the traffic matrix. This content specific link matrix $Gt_{C_k}$ is a multihop scheduling sequence (MSS) matrix. The completed MSS matrices for the above SS matrices are as follows:

$$MSS_1 = \begin{bmatrix} 5 & 4 & 3 \\ 3 & 3 & 1 \\ 1 & 1 & 2 \end{bmatrix} \begin{matrix} \text{transmitting node} \\ \text{receiving node} \\ \text{traffic} \end{matrix}$$

$$MSS_2 = \begin{bmatrix} 5 & 4 & 2 \\ 2 & 2 & 1 \\ 1 & 1 & 2 \end{bmatrix} \begin{matrix} \text{transmitting node} \\ \text{receiving node} \\ \text{traffic} \end{matrix}$$

The first row represents the node transmitting the data, the second row represents the node receiving the data and the third row represents the data rate across the communications link for the respective type of content.

Once links and rates have been assigned for each node in layer $M_d$, processing tasks $P_{C_k}$ are added to the link matrix $l_{C_k}$ and the data rates are updated to take into account the data aggregation 630. Processing tasks are assigned their own column in the link matrix $l_{C_k}$ with the top row indicating the node ID that conducts the processing and the bottom row indicating the data rate of the processing task.

Once processing tasks have been added, traffic after data aggregation is computed. This allows the link matrix to be updated with traffic rates after the processing tasks (data aggregation) have been taken into account. This is because the data aggregation will ultimately result in a reduction in the data rate from the node conducting the processing.

It is then determined whether the last layer has been reached (whether d=1) 640. If not, the layer number is decreased by one 645 and the method loops back to step 620 to calculate the next hop relay nodes and populate the relevant sections of $l_{C_k}$ for the next layer. If the last layer has been reached the content specific routing topology $Gt_{C_K}$ is determined from the link matrix $l_{C_K}$ and the list of nodes with content type $C_k$.

It is then determined if routing has been conducted for all K content types (i.e. whether $C_k$=K) 650. If not, then the content type counter $C_k$ is increased by one 655 and the method loops back to step 615 to calculate the content specific routing topology for the next content type. If the routing has been conducted for all K content types (i.e. if the $K^{th}$ content type has been reached), then the set of routing topologies {$Gt_{C_1}$, $Gt_{C_2}$, . . . , $Gt_{C_K}$} for all content types is output 660.

Figure 7:
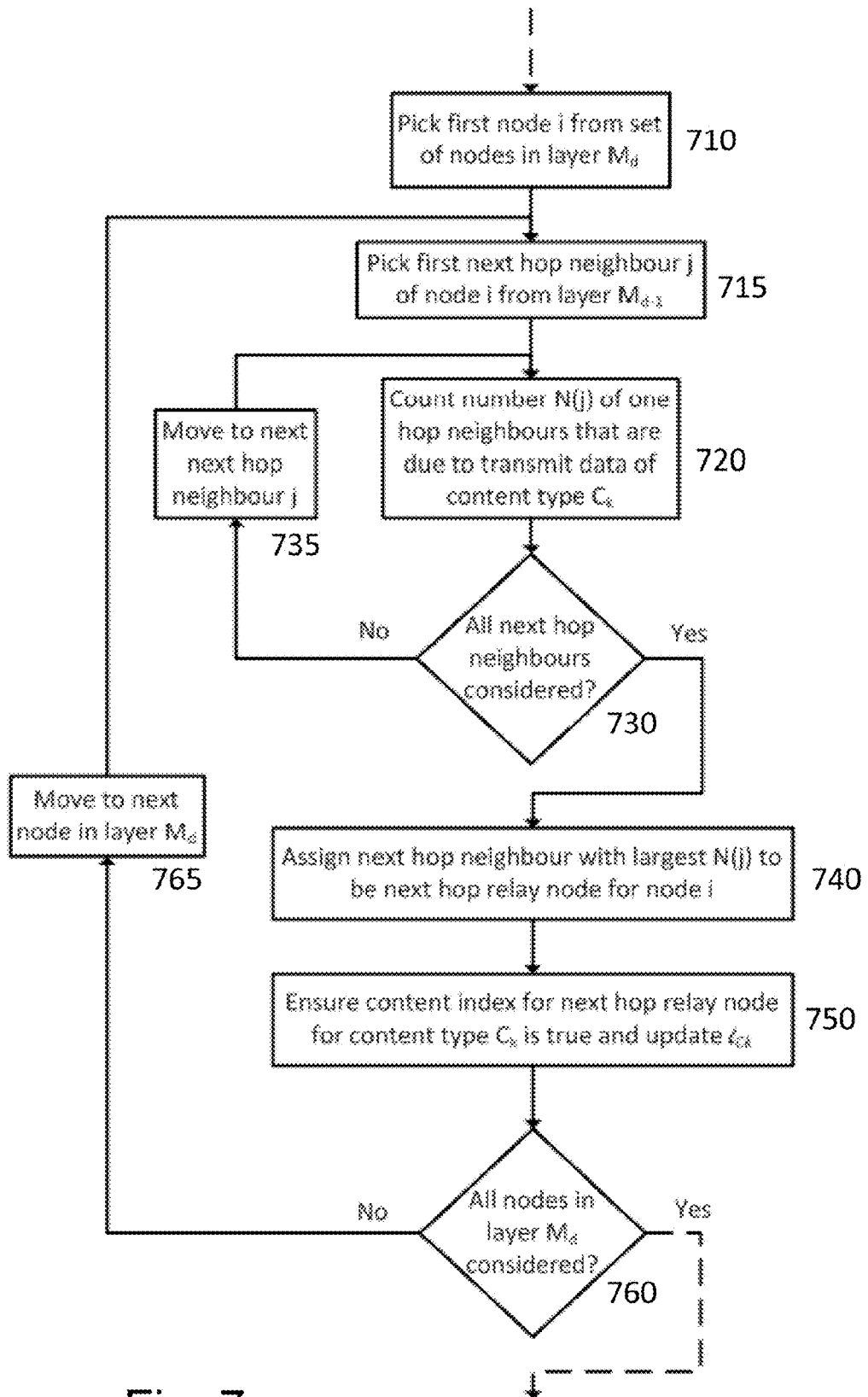
FIG. 7 shows a method of determining next hop relay nodes in accordance with an arrangement.

FIG. 7 shows a method of determining next hop relay nodes in accordance with an arrangement. The method depicted is equivalent to steps 620 and 625 of FIG. 6 and the dashed lines represent where the method enters from steps 615 or 635 of FIG. 6 and then subsequently exits to step 630 of FIG. 6.

Once the layer has been chosen (steps 615 or 635), a first (target) node from the layer is selected from the set of nodes in the layer 710. This may be implemented simply by setting a node index i to be equal to one, to select the first node in the set of nodes in the layer.

After this, a first next hop neighbour is selected from the set of next hop neighbours to the target node i 715. Again, this can be achieved by setting a next hop neighbour index j to equal one. As defined above, the next hop neighbours are the set of nodes that are within one hop of node i and are located one layer below the layer of node i (one hop closer to the hub). The next hop neighbours for the target node i form a set of candidate nodes to become the relay node for the target node.

After this, the method counts the number of one hop neighbours of node j (the selected next hop neighbour) that are due to transmit data of content type $C_k$. To achieve this, a content index is maintained that is true for a given node if it is due to transmit content type $C_k$ and false if it is not. The content index covers all nodes and all content types. Accordingly, the method considers each one hop neighbour of node j and for each one that is due to transmit data of content type $C_k$ one is added to a count index $N_{C_k}$.

It is then determined if all of the next hop neighbours of node i have been considered 730 (i.e. whether j equals the total number of next hop neighbours of node i). If not, then the method moves to the next next hop neighbour 735 (i.e. adds one to the next hop neighbour index j) and returns to step 720 to determine N(j) for the next next hop neighbour from the set of candidate nodes.

If all of the next hop neighbours of node i have been considered, then it is determined which next hop neighbour of node i has the most one hop neighbours that are due to transmit data of content type $C_k$ (has the largest value of N(j)). The next hop neighbour with the largest value of N(j) is set to be the next hop relay node for node i 740.

It is then ensured that the content index for the next hop relay node for content type $C_k$ is true and the content specific link matrix $l_{C_k}$ is updated with the assigned communication link and associated data rate (as discussed above) 750.

The method then determines if all of the nodes in layer $M_d$ have been considered 760. That is, whether next hop relay nodes have been assigned to all nodes in the layer (or whether i is equal to the total number of nodes in the layer $M_d$). If not, then the method moves to the next node in the layer (i is increased by one) 765 and the method loops back to step 715 to begin determining the next hop relay node for the next node in the layer. If all nodes in the layer have been considered, then the method moves on to step 630 shown in FIG. 6 to determine whether the last layer has been reached and, if not, to move down a layer.

Accordingly, it can be seen that, for each node in the layer $M_d$, the maximum number of one hop neighbours for a given next hop neighbour is found by searching through the one hop neighbours for the given next hop neighbour and adding one to a counter for each node that is due to transmit data of the specific content type $C_k$ (has a rate $R_{C_k}$ for that content type greater than zero, or based on the content index for each node). The next hop neighbour with the largest counter $N_{C_k}(n)$ is set to be the next hop relay node.

Algorithm 1 Algorithm for Content Centric Route Finder

1: Input: Network G(V,A), Applications $C_k$ and traffic $R_{C_k}$
2: for Each content $C_k$ | k ∈ K do
3:　for (d = $d_{max}$; d > 0; d = d − 1) do
4:　　for Each node i ∈ $M_d$ & i ∈ $V_{C_k}$ do
5:　　　Find next hop neighbour set (candidate ∈ $M_{d−1}$)
6:　　　for Each node j ∈ candidate do
7:　　　　for Each Node j's one hop neighbour n do
8:　　　　　%Node n has content $C_k$%
9:　　　　　If ContentIndex(n, $C_k$) = true then Algorithm 1 Algorithm for Content Centric Route Finder (continued)

10:　　　　　　$N_{C_k}$ (n) = $N_{C_k}$ (n) + 1
11:　　　　　end if
12:　　　　end for
13:　　　　NeighbourContentList(j) ← $N_{C_k}$
14:　　　end for
15:　　　BestNode = max(NeighbourContentList)
16:　　　If ContentIndex(BestNode, $C_k$) = false then
17:　　　　ContentIndex(BestNode, $C_k$) = true
18:　　　end if
19:　　　NextHopRelayList $\Gamma_{M_d}$ ← BestNode
20:　　　routing path e(i, BestNode) = 1
21:　　　$l_{C_k}$ (e) = $R_{C_k}$ (i)
22:　　　$Gt_{C_k}$ ($V_{C_k}$, $l_{C_k}$) ← $l_{C_k}$ (e)
23:　　end for
24:　　for Each node n ∈ $\Gamma_{M_d}$ do
25:　　　Add processing task $l_{C_k}$ ← $P_{C_k}$
26:　　　$R_{C_k}$ (n) ← Link Traffic after Aggregation
27:　　end for
28:　end for
29: end for
30: return $Gt_{C_k}$ Algorithm 1 details the content centric route finder shown in FIGS. 6 and 7.

Figures 8A, 8B:
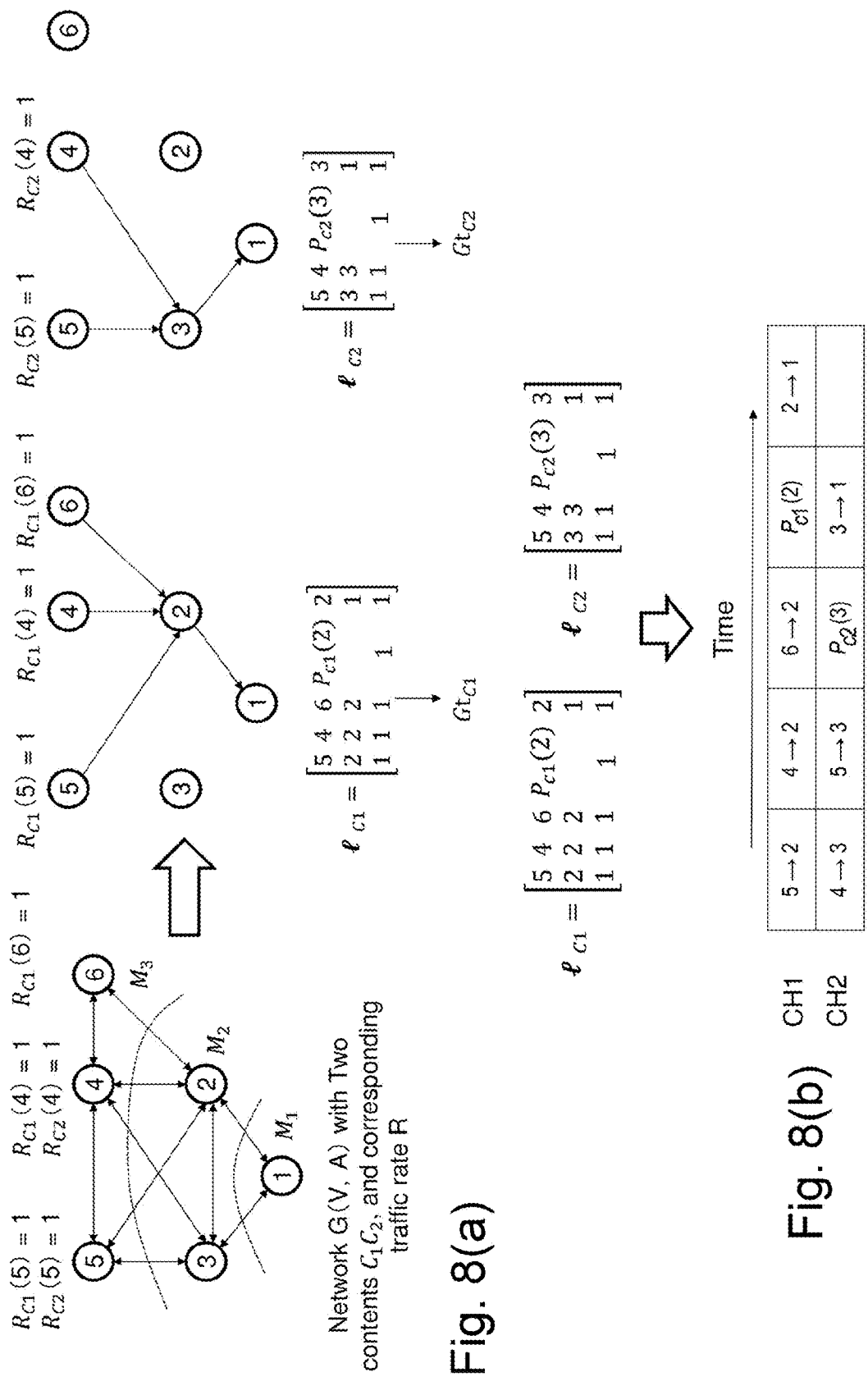
FIG. 8(a) shows an example of content specific routing according to an arrangement.
FIG. 8(b) shows an example of content specific scheduling according to an arrangement.

FIG. 8(a) shows an example of content specific routing according to an arrangement. The network arrangement is similar to that of FIG. 4; however, the second level includes an additional node 6. Both node 5 and node 4 generate content C1 and C2, while node 6 only generates content C1. The traffic rate for these three nodes is 1 traffic unit. The content centric route finder will first form a routing topology for each type of content. In the present case, node 5 is the first to have its BestNode for C1 assigned. Since node 2 is connected to all three of nodes 4, 5 and 6, each of which have content C1, it has three one hop neighbours with content C1 (i.e. NeighbourContentList for node 2 is equal to three for C1). In contrast, the NeighbourContentList for Node 3 is only equal to 2. As node 2 has the most one hop neighbours with content C1, node 2 is chosen as the next hop relay node for Node 5 for content C1. The ContentIndex(2, C1) is set to true to account for the transfer of content of type C1 to node 2 from node 5.

When choosing the next hop relay node for node 4, node 2 now has a NeighbourContentList=4. As before, by comparing the NeighbourContentList, node 2 again is selected as the BestNode for node 4. The same applies to find the BestNode for node 6. Once all the nodes in layer $M_3$ have been assigned their next hop relay nodes for content C1, processing tasks $P_{C1}$ will be added to the corresponding aggregation node. In this example, node 2 performs aggregation for content C1. We further assume that after three packets are received at Node 2, the aggregation process outputs only one aggregated packet which then will be assigned as the traffic rate for link Node 2→Node 1.

The same applies to content C2. Node 3 is selected as the next hop relay node for node 4 and node 5, as shown in FIG. 7. It is also possible to choose node 2 as the BestNode for C2, since node 2 and node 3 have the same number of one hop neighbours having content of type C2; however, if node 2 was also selected to relay and process content C2, it is very likely to become the bottleneck node. The method of removing bottlenecks from the routing topology will be explained in more detail later when discussing the congestion point analyser during the scheduling process.

As discussed above, a matrix $l_{C_k}$ is formed for the links in the routing topology. This is shown in FIG. 8(a) for $l_{C_1}$ and $l_{C_2}$. These matrices are link matrices that are added to respective graphs ($Gt_{C_k}$) that also include the nodes. The routing topology graphs are input into the scheduler to determine content specific schedules. Alternatively, the link matrices may be input into the scheduler.

The Content Schedule Manager (CSM)

The content scheduler in the content schedule manager takes each content specific routing topology $Gt_{C_k}$ (or its associated link matrix $l_{C_k}$) as an input and assigns timeslots to each communication and processing task in $l_{C_k}$ according to the corresponding traffic rate. The scheduling rules are:

1. No conflicting links should be scheduled in the same timeslot. That is, no transmission should be scheduled involving a node (either as transmitter or receiver) in a timeslot in which that node is already scheduled to transmit or receive data. A node can process data whilst transmitting or receiving data, for instance, the node can process data of one type of content whilst transmitting data of a different type of content.
2. No two transmissions should be made using the same channel (or colour) in the same timeslot within the interference range of each other. If the transmitting and receiving nodes of the two transmissions are outside of interference range, then the same channel may be used in the same timeslot for both transmissions. Interfering links may be assigned to the same timeslot if using different channels.
3. A minimum delay is required for a processing task $P_{C_k}$ to allow time to process the content $C_k$ on the node i. This delay is applied to the node performing the processing for any task relating to the same type of content $C_k$. Accordingly, whilst data of a given type is being processed the processing node is not to be scheduled to transmit or receive data of the content type. This ensures sufficient time to process the data. Data of a different content type can be sent or received by the node during this time.

The CSM supports multi-channel and time-slot assignment and applies a scheduling procedure that is compliant with the latest TSCH mode in the IETF 6TISCH standard.

The scheduler allocates cells to communication links or processing tasks over a particular scheduling period. A scheduling period is a period of time for which a schedule is to be defined, which will repeat over time. A scheduling period may be referred to as a superframe. A scheduling period is divided into a plurality of timeslots. A scheduling period is a standard unit of time determined by the scheduler, wherein a schedule defined for the scheduling period is repeatedly executed over the scheduling period. A cell is a timeslot on a communications channel.

A schedule is defined for each type of content by allocating timeslots to each traffic unit (data packet) over each communication link contained in the respective link matrix $l_{C_k}$ (the MSS matrix). Link scheduling should be conducted in decreasing order of the network layers. As $l_{C_k}$ is built up in decreasing order of the network layers, link scheduling occurs based on the order of the listing of links in $l_{C_k}$. Each transmission is assigned a specific channel. Channel assignment is based on whether or not concurrent transmission will cause interference. If links are scheduled in a time slot in which they interfere, a different channel offset will be used. Otherwise, the same channel and same timeslot will be given to those communication links.

The scheduler utilises the above set of rules to avoid collisions. A communication matrix f is utilised to check for collision and interference before assigning a cell. The communication matrix $\Omega$ is an M-by-$N_{ch}$-by-S matrix, wherein M is the total number of nodes in the network, $N_{ch}$ is the number of channel offsets and S is the total number of timeslots in the scheduling period. Each time a communications link or processing task is to be allocated to a cell, the matrix $\Omega$ is checked in order to select a cell that does not collide or interfere with already allocated cells. Once a cell has been allocated, the corresponding entries for the node(s) involved in the allocated process are marked in the $\Omega$ matrix. Accordingly, for an allocated communication link the corresponding entries for the sender and receiver nodes are marked, whilst for an allocated processing task the corresponding entry for the node conducting the processing task is marked.

For a transmission, both the sender node's and receiver node's neighbours need to be checked for interference (both transmitting or receiving) for any scheduled cell, as communication during a cell comprises two communications—the sender transmitting the packet and the receiver sending an acknowledgement.

Accordingly, for a given task (i.e. a processing task or transmission) the scheduler finds a timeslot with no conflict links marked in f. If the allocated task is a transmission, then the scheduler finds a channel with no interfering neighbouring communications marked in $\Omega$. If not found, the scheduler checks for a different cell to see if any non-conflicting timeslots exist with a non-interfering channel. If an appropriate cell (and channel, for a transmission link), is found, then the task is added to the schedule and marked in the relevant portions of $\Omega$ as discussed above. By continually updating $\Omega$, the scheduler avoids scheduling conflicting tasks.

The scheduler is run for each type of content using the associated content specific routing topology. The communications matrix $\Omega$ is maintained across the scheduling of different content types to avoid conflicts between different content types.

An example of a schedule for traffic topologies generated using the arrangement of FIGS. 6 and 7 is illustrated in FIG. 8(b).

FIG. 8(b) shows an example of content specific scheduling according to an arrangement. In this case, the two different content types, C1 and C2, are transmitted over different channels CH1 and CH2 to avoid interference.

Interaction Between CRM and CSM

In CRM, using Algorithm 1, a high data aggregation path for each content flow can be produced. This might, however, lead to traffic hot-spots in the network as a few aggregation nodes can be heavily loaded with excessive communication jobs as well as extensive computation tasks for multi-content data processing, resulting in significantly delays. That is, the most efficient routing topology may have a number of bottlenecks that cause congestion in the network.

To address such an issue, a network congestion point analyser is adopted in the CSM to detect 'hot spots'. An iterative method is utilised in a cross-layer approach that identifies congestion points after scheduling has been completed and applies a path optimiser to determine a new route to avoid congestion. The RCM and RSM are repeated to optimise the path to produce the shortest possible schedule.

Figure 9:
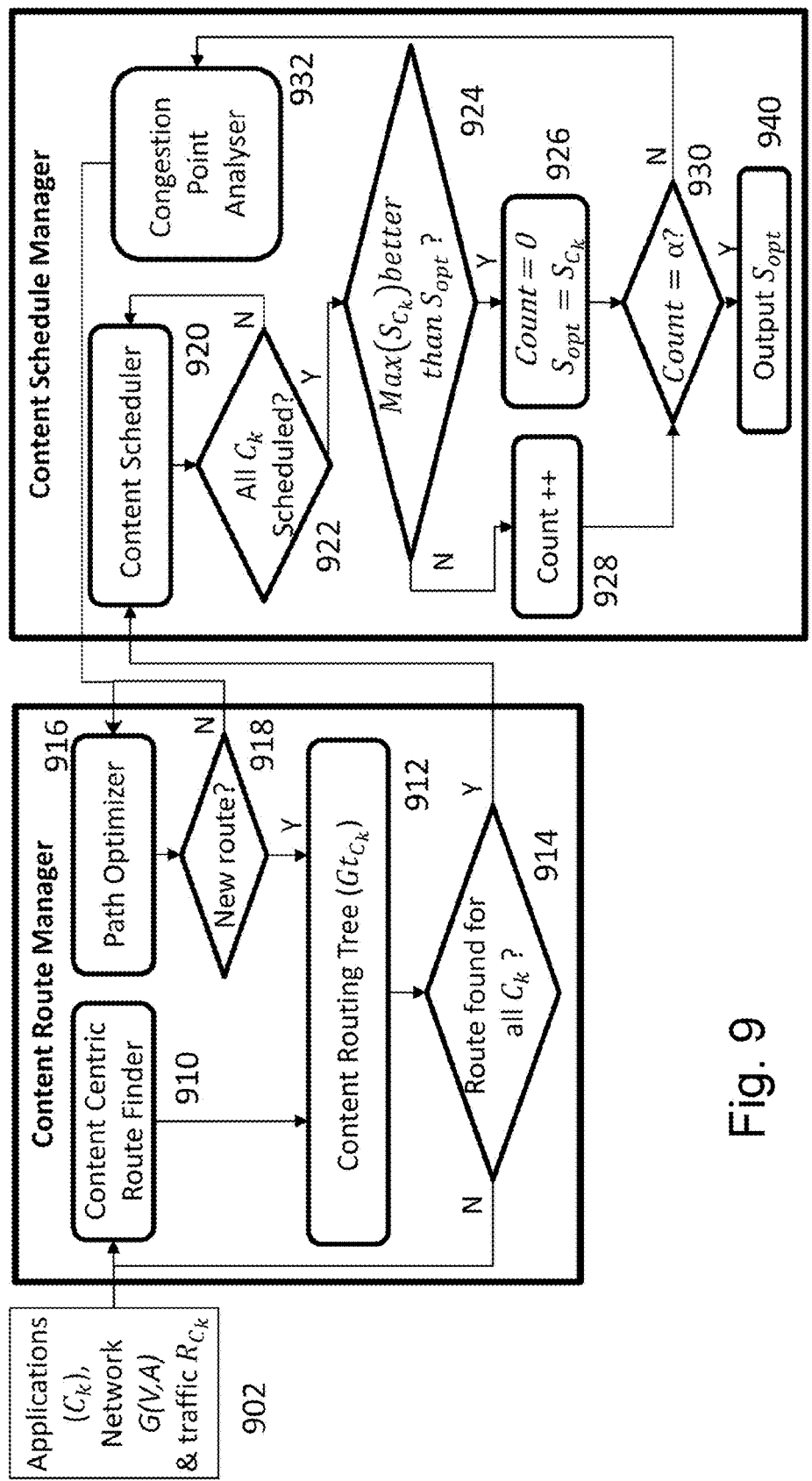
FIG. 9 shows a method for determining content specific schedules according to an arrangement.

FIG. 9 shows a method for determining content specific schedules according to an arrangement. The method begins by initially acquiring 902 the list of types of content (applications) $C_k$, the network topology G(V,A) and content specific traffic rates $R_{C_k}$. These can be obtained by monitoring transmissions in the network when the nodes are operating under a contention based scheme, e.g. CSMA. For instance, the network topology can be determined by the network controller if each node sends the network controller a list of the nodes that it can detect (the nodes that are within transmission range). The types of content can be found by monitoring how the data is used (or by considering the content of the data) and the traffic rate can be determined by monitoring where data packets received at the hub originate from (which nodes generate the data). Once collected, the data is input into the content route manager (CRM).

The content route manager first determines a content specific routing topology 910 for a first type of content $C_k$ using the content centric route finder, as discussed above with regard to FIGS. 6 and 7. The content centric route finder outputs 912 a content routing tree $Gt_{C_k}$ (the content topology matrix $1_{C_k}$ and the corresponding nodes). It is then determined if a route has been found for all types of content $C_k$ 914. If not, the method loops back to the content centric route finder 910 to find a content specific routing topology for another type of content. If a route has been determined for all types of content, then the routing topologies are output to the content schedule manager (CSM).

The content schedule manager implements the content scheduler 920 to determine a content specific schedule for a first type of content $C_k$, as discussed above. It is then determined 922 if a schedule has been determined for all types of content $C_k$. If not, then the method loops back to step 920 to determine a schedule for another type of content. If schedules have been assigned for all types of content then it is determined if the largest schedule $Max(S_{C_k})$ from the set of content specific schedules $S_{C_k}$ is better than (shorter than) the length of the maximum schedule length from the current optimum set of schedules $S_{opt}$. As no current optimum schedule has been determined on the first iteration, this step can be skipped initially (or the optimum schedule length can be initially set to infinity) with the method moving straight to step 926.

In step 926, an iteration count index is set to zero and the set of schedules are set to be the optimum schedules $S_{opt}$. It is then determined if the maximum number of iterations has been reached 930. That is, it is determined whether the iteration count index equals a threshold number of iterations a. If not, then the current optimum schedules $S_{opt}$ are passed to the congestion point analyser.

The congestion point analyser 932 determines the nodes that have been assigned the highest percentage of the total number of timeslots in the overall schedule (the schedule formed from the combination of the content specific schedules). Either a predefined number of the most busy nodes are determined to be bottleneck nodes (e.g. the three nodes having the highest percentage of traffic) or a threshold percentage is utilised, with any node that is assigned more than this threshold percentage being determined to be a bottleneck node (a congestion point). The routing topology and the node IDs of the bottleneck nodes are passed back to the CRM to optimise the paths to avoid the congestion points.

A path optimiser 916 moves communication links related to the least important content type that transmit to the bottleneck nodes in the respective routing topology away from the bottleneck nodes to the next best neighbouring nodes determined using the above routing method. That is, each link is moved to the node with next highest number of one hop neighbours due to transmit data according to the respective content type. The least important content type may be based on predefined importance levels assigned to the content types and/or the applications to which the content types relate.

It is then determined if a new route has been found 918. If so, a new traffic topology graph is formed 912. The path optimiser is implemented for the routing topology for each type of content before the new routing topologies are passed back to the content scheduler 920 to produce a new set of schedules.

If a new route hasn't been found, the method loops back to the path optimiser 916 to move links relating to the next least important content type. If no new routes can be found for any type of content then the current schedules and topologies are output (not shown in FIG. 9).

Providing the maximum length of the new schedules is less than the maximum length of the current optimum set of schedules $S_{opt}$, the new set of schedules will be set to be the optimum schedules $S_{opt}$ and the iteration count index will be reset 926. If the maximum length of the new schedules is longer than that of the current optimum set of schedules $S_{opt}$ then the iteration count index will be increased by one 928. It is then determined again if the threshold number of iterations has been reached 930. If not, the congestion point analyser is run 932 and the method determines a new set of routing topologies and schedules via the path optimiser 916. If the maximum number of iterations has been reached (if the iteration count index equals the threshold a) without any improved schedules being found, then the set of optimum schedules $S_{opt}$ is output 940.

It should be noted that the set of optimum schedules $S_{opt}$ can be combined into a final combined schedule, either at step 926, or when the optimum schedules $S_{opt}$ are output. Once combined, the combined schedule can be divided up into node specific schedules, each detailing the tasks of a specific node. These node specific schedules can then be distributed to the respective nodes to allow the network to implement the determined schedule.

In light of the above iterative method, an improved schedule is obtained in which data of different types of content is routed via different routes and wherein congestion points are avoided.

Figure 10B:
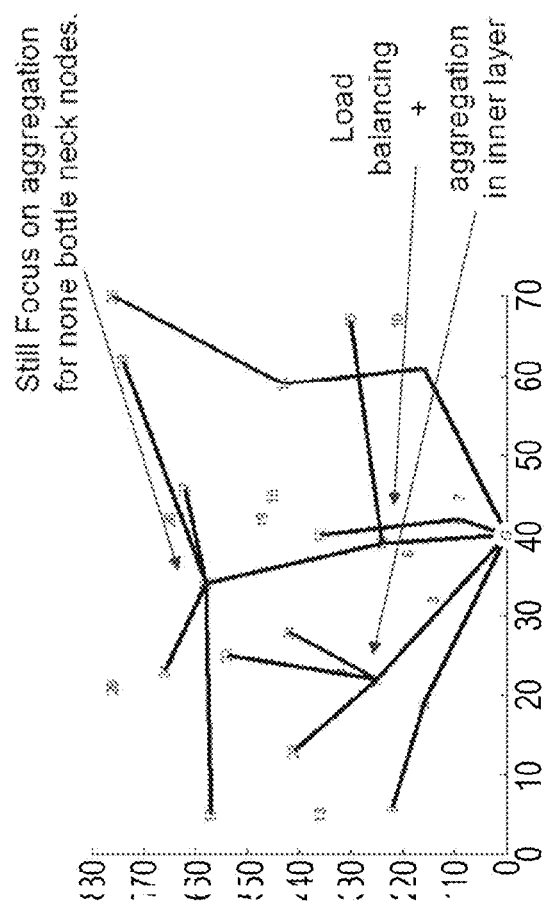
FIG. 10(b) shows a distributed routing topology avoiding the congestion points.
Figure 10A:
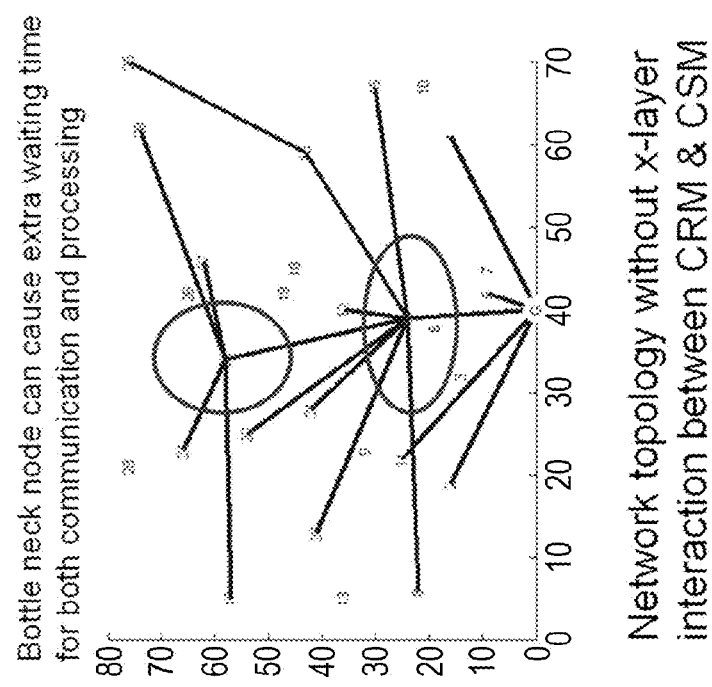
FIG. 10(a) shows a routing topology with congestion points.

FIG. 10(a) shows a routing topology with congestion points. In FIG. 10(a), two congestion points (circled) cause extra waiting time for both communication and processing as they have a disproportionately large number of tasks/cells assigned to them.

FIG. 10(b) shows a distributed routing topology avoiding congestion points. This routing topology is achieved when the cross layer iterative method described herein is utilised. In this case, the outer congestion point is not determined to be a bottleneck node therefore is maintained as it does not have a sufficiently large proportion of the overall available timeslots. Nevertheless, the bottleneck node in the inner layer is split (links to the bottleneck node are rerouted) in order to avoid congestion. The links are assigned to the next best nodes so that data aggregation can still be implemented. Through this method the benefits of data aggregation are balanced with the benefits of load balancing across the network.

Message Prioritisation

By using in-network data aggregation, savings can be made on limited resources (e.g. time and spectrum) for scheduling. With those additional resources available, premium timeslots can be introduced which can be used by time critical messages. Premium timeslots are reserved in a fixed interval in a super frame (e.g. every 10 timeslots), this interval can be determined, for example, based on the available resources and the total amount of network traffic. During normal operation, the premium slots are treated as shared slots, so every node can compete (in-slot CSMA/CA) in order to use them; however, once a request (e.g. a request to send in a request to send, clear to send (RTS/CTS)

scheme) to transmit a time-critical message has been received, other nodes will back off for premium slots contention.

Two features are used to ensure ultra-low latency for time-critical messages:
1) A content-dependent immediate processing byte, which can be adopted in the packet header or reserved space in the payload (e.g. the first byte in the payload is reserved for an immediate processing byte only).
2) Content-independent premium timeslots. Redundant timeslots are reserved as premium timeslots for the schedules for all types of content and shared across all types of content.

During normal operation, data collected by the sensor nodes is buffered and aggregated using the scheduled timeslots. Premium timeslots are used as shared contention resources for all nodes; however, if a time critical message (with content $C_k$) is sent with an immediate processing byte in its header, all the processing nodes along its multi-hop path to the data concentrator (the hub) will immediately process the data stored in a corresponding content buffer $B_{C_k}$, add the same immediate processing byte in the header of the outgoing message and sent it out in the next available scheduled timeslot or premium timeslot. Please note that only the corresponding content will be immediately processed while other messages belonging to different content types will be buffered and processed according to the schedule. Nevertheless, the premium timeslot is content-independent, meaning that during a premium timeslot all non-urgent messages (regardless of content type) should back-off when an emergency message is detected.

Figure 11:
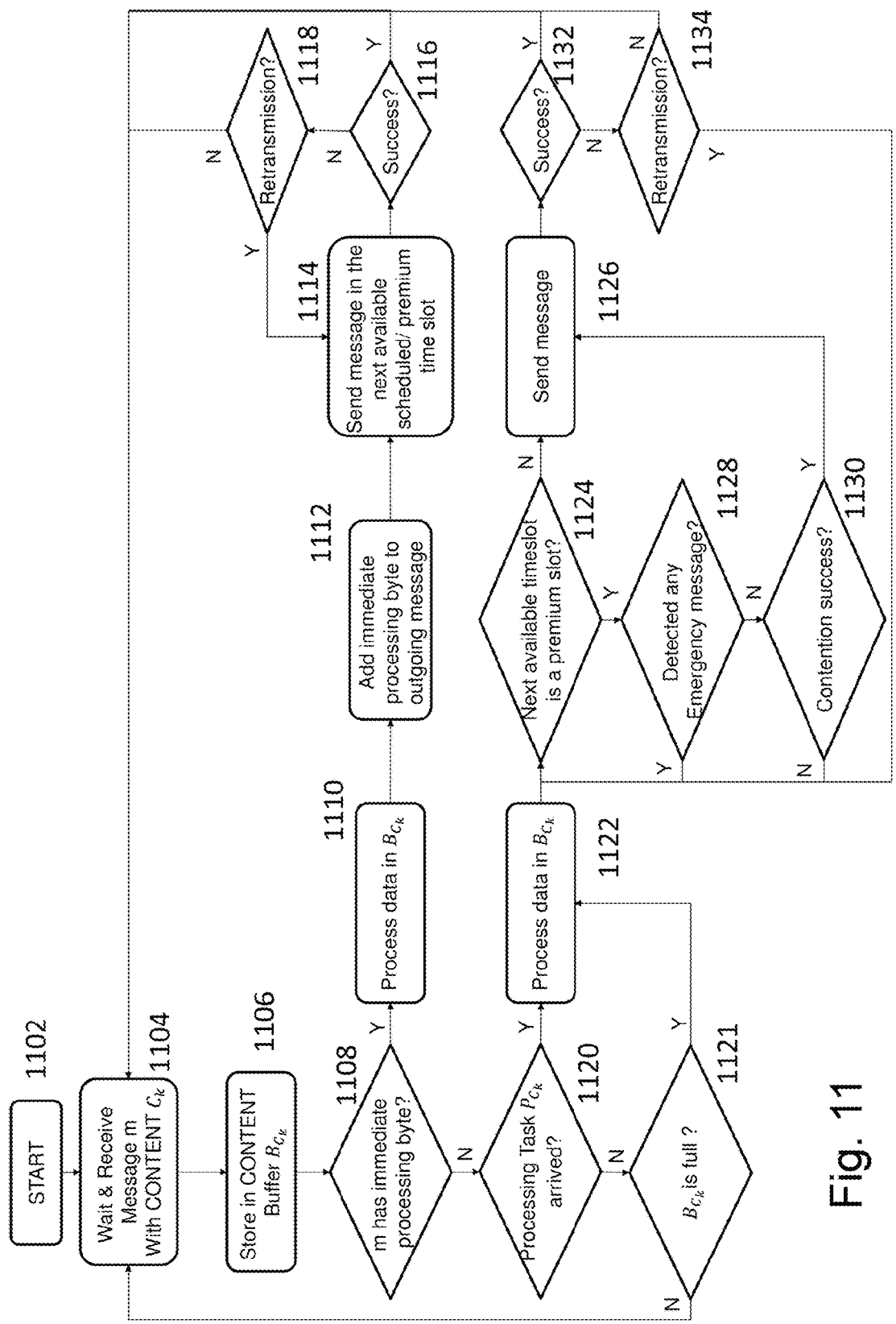
FIG. 11 shows a method of operating a node according to an arrangement.

FIG. 11 shows a method of operating a node according to an arrangement. This method assumes that the schedule has already been assigned to the node. After the node is activated 1102 it waits to receive a message m. When a message m is received 1104, the content of the message is extracted from the message and the type of content $C_k$ is identified. A message may be a packet or a portion of a packet of data transmitted over the wireless network. The message therefore comprises part or all of the payload of the received packet.

The content in the message is stored 1106 in a respective buffer $B_{C_k}$ in the node associated with the type of content $C_k$. Accordingly, each node has a buffer for each of type of content $C_k$.

The node then determines whether the message has an immediate processing byte 1108. This can be determined by checking a predefined section of the message, for instance, a header of the message.

If the message has an immediate processing byte then the node processes the data in the respective buffer $B_{C_k}$ 1110 to aggregate all content of the respective type of content stored in the buffer $B_{C_k}$, adds an immediate processing byte to an outgoing message that includes the aggregated content 1112 and sends the outgoing message in the next available timeslot 1114. An available timeslot is either a premium timeslot or a timeslot where transmission of the respective content type is scheduled for the node. Accordingly, even though the message may be sent in the premium timeslot, it is sent in the next scheduled timeslot if this is scheduled before the next premium timeslot. If two nodes attempt to transmit time critical messages in the premium timeslot, a contention mechanism (e.g. CSMA) is used to determine which node gets assigned the premium timeslot. The node that is not assigned the premium timeslot backs off and waits for the next available timeslot.

After the outgoing message has been sent, the node determines whether the transmission was a success 1116 (e.g. whether a message receipt acknowledgement has been received from the node receiving the outgoing message). If not then the node determines whether to retransmit the outgoing message 1118 (e.g. whether a predefined number of failed transmission attempts have been made). If the node decides to retransmit, it loops back to step 1114 to attempt to send the signal again. If not, it loops back to step 1104 to wait for further messages.

If the message does not have an immediate processing byte then the node determines that the message is not time-critical and the node determines whether a processing task for the respective type of has been scheduled $1_{C_k}$ for the current time 1120.

If no processing task $P_{C_k}$ is scheduled for the respective type of content then it is determined whether the buffer for the $B_{C_k}$ respective type of content $C_k$ is full 1121. If so, then all of the data in the respective buffer $B_{C_k}$ is processed to aggregate all content of the same content type $C_k$ 1122.

If a processing task $P_{C_k}$ is scheduled for the respective type of content then all of the data in the respective buffer $B_{C_k}$ is processed to aggregate all content of the same content type $C_k$ 1122.

After the data in the buffer is processed 1122, the node waits for the next available timeslot. It is then determined whether the next available timeslot is a premium timeslot 1124. If not, then the available timeslot is a scheduled transmission of that type of content, so an outgoing message comprising the aggregated data is sent to the node that is scheduled to receive the data 1126.

If the next available timeslot is a premium timeslot then the node determines if any emergency (time-critical) messages have been received 1128. That is, it is determined whether any messages been detected that include an immediate processing byte, regardless of whether or not the messages were directed to the node. If an emergency message has been detected, then the node backs off and waits for another available timeslot to allow the emergency message to be sent over the premium timeslot. The node therefore loops back to 1124 to determine whether the next available timeslot is a premium timeslot.

If no emergency messages have been detected then the node begins carrier sensing multiple access with collision avoidance (CSMA/CA) to compete for use of the timeslot 1130. If the node is clear to transmit over the channel, then the message is sent 1126. Otherwise, the node returns to step 1124 to find the next available timeslot and determine whether it is a premium timeslot.

Once a message has been sent, the node determines whether or not the transmission was a success 1132. If so, then the node returns to step 1104 to wait for a new message. If not, then the node determines whether to retransmit the message. If so, then the node returns to step 1124 to find the next available timeslot and determine whether it is a premium timeslot. If not, then the node returns to step 1104 to wait for a new message.

The above method therefore provides an efficient means of prioritising time critical messages.

Network Performance

The proposed CONCISE approach has been assessed via simulation, and compared with the following two systems:
1. System 1: RPL+AMUS (RA)
2. System 2: RPL+AMUS+data Aggregation (RAA)

RPL is a standardized routing protocol for low power and lossy networks and AMUS is a scheduling algorithm proposed for the 6TiSCH standard that doesn't implement content specific scheduling. The average traffic across the networks was 2 packets per node per 100 ms. Average link quality resulted in a 70% successful reception ratio.

Figure 12:
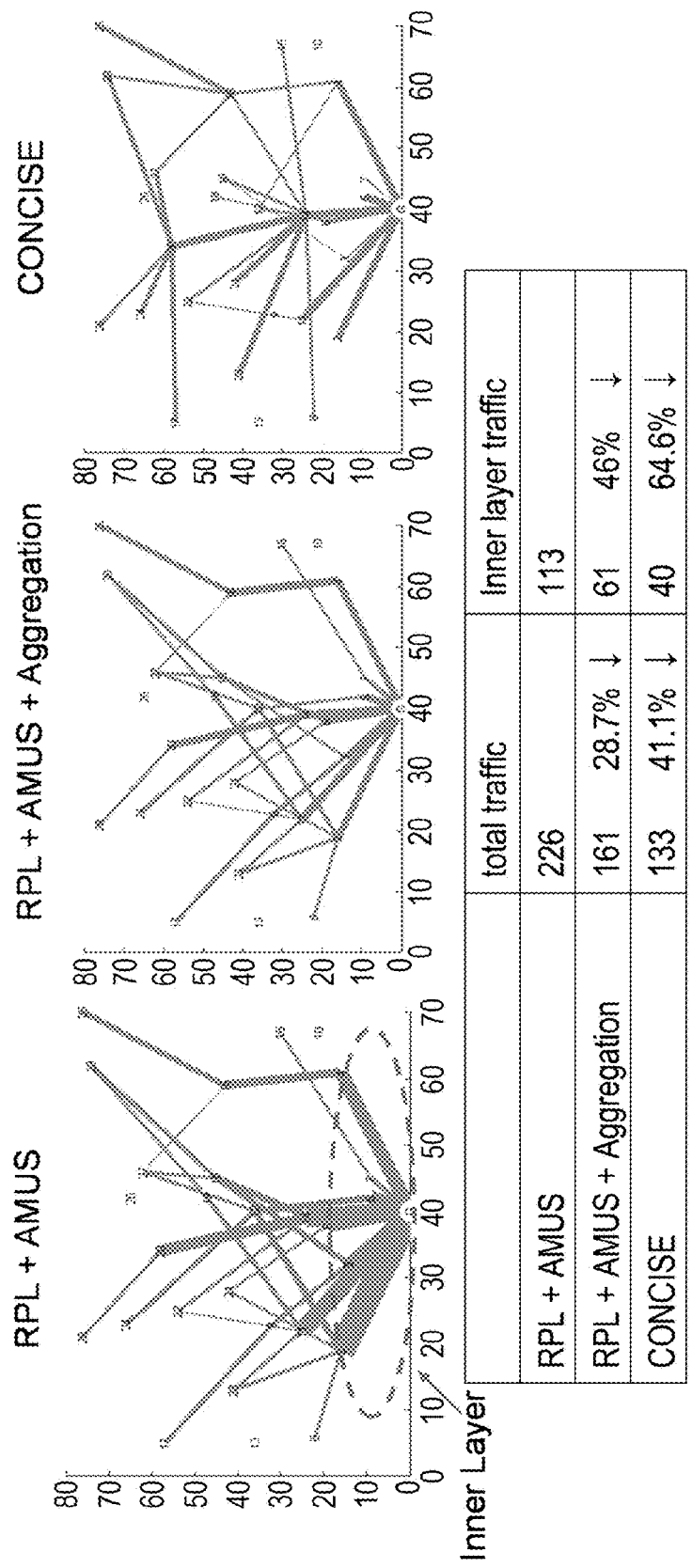
FIG. 12 shows the performance of an arrangement (CONCISE) in terms of traffic reduction relative to two alternative systems (RA and RAA)

FIG. 12 shows the performance of an arrangement (CONCISE) in terms of traffic reduction relative to two alternative systems (RA and RAA). It can be observed that CONCISE reduces the network traffic by 41.1% via data aggregation within the network compared with RA without aggregation. In addition, since it uses content centric routing to facilitate data aggregation, a 28.7% reduction in traffic is achieved compared with the RAA system, in which data aggregation is enabled but only one routing path is selected for all types of content. In particular, CONCISE is able to significantly reduce the traffic in the inner layers by almost 65% compared with RA, which can have a big impact during the scheduling stage.

Figure 13A:
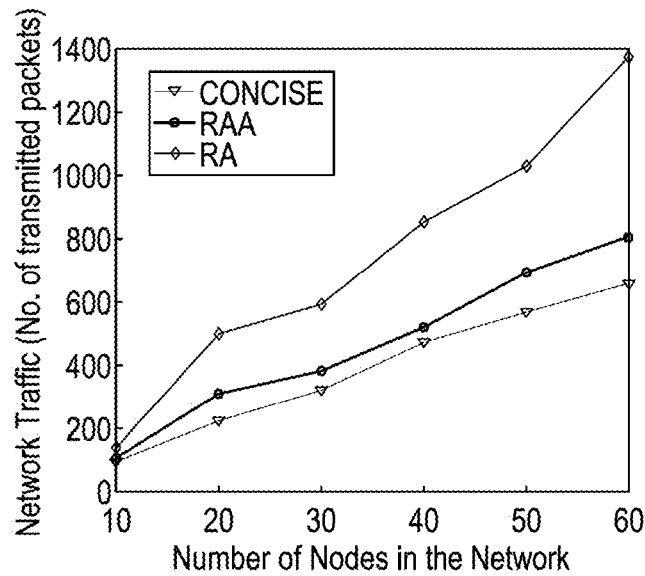
FIG. 13(a) shows the traffic for increasing network size for an arrangement (CONCISE) and the two alternative systems (RA and RAA)
Figure 13B:
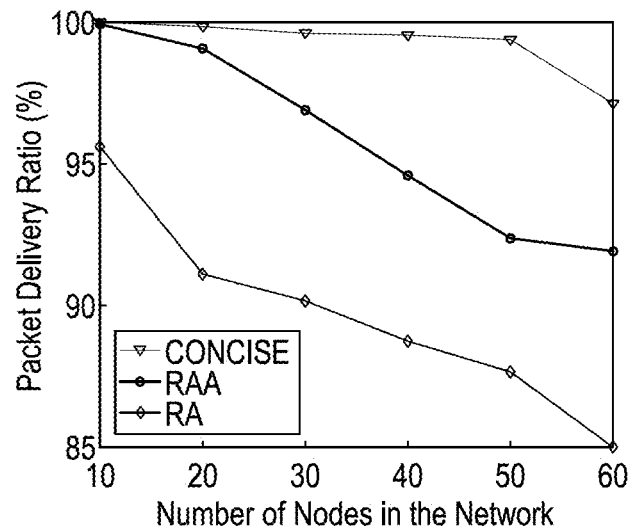
FIG. 13(b) shows the packet delivery ratio for increasing network size for an arrangement (CONCISE) and the two alternative systems (RA and RAA)

FIGS. 13(a) and 13(b) show the traffic and packet delivery ratio for increasing network size for an arrangement (CONCISE) and the two alternative systems (RA and RAA). It can be seen that CONCISE's performance in terms of traffic reduction becomes even better when the network scales up. Equally, CONCISE has a very high packet delivery ratio (99.9%) when the network has less than 20 nodes. When the number of nodes increases, CONCISE continues to outperform the other two systems.

Figure 14A:
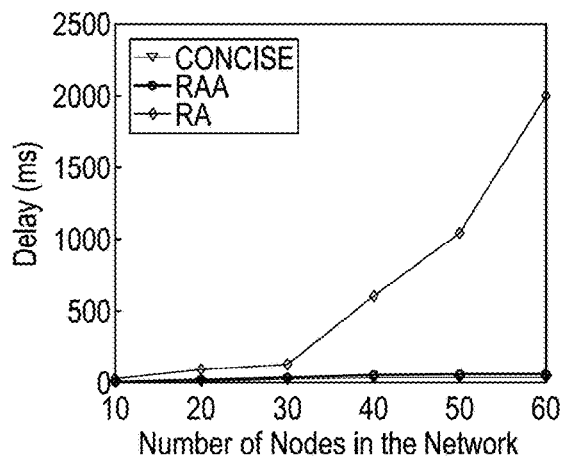
FIG. 14(a) shows the network communication latency against the number of nodes in the CONCISE, RA and RAA systems.
Figure 14B:
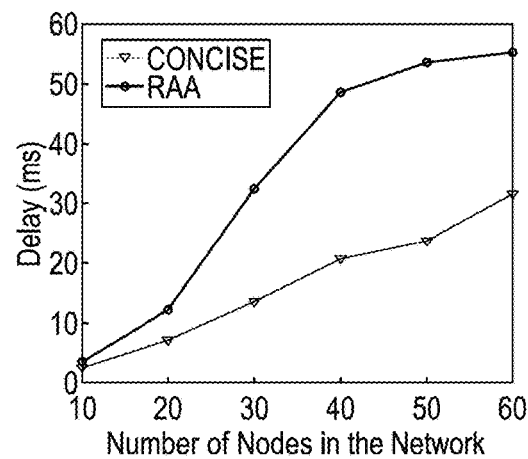
FIG. 14(b) also shows the network communication latency against the number of nodes in the CONCISE, RA and RAA systems.

FIGS. 14(a) and 14(b) show the network communication latency against the number of nodes in the CONCISE, RA and RAA systems. FIG. 14(b) depicts the same data as FIG. 14(a), with a finer scale on the y-axis (delay). Thanks to in-network data aggregation, both CONCISE and RAA have more than ten times less latency compared to RA when the network has more than 40 nodes. Clearly, without data aggregation, the scalability of the network is very limited. In addition, compared with RAA with data aggregation, CONCISE further reduces traffic via content centric routing. Accordingly, the CONCISE system has less communication latency than the two alternative systems.

Figure 15A:
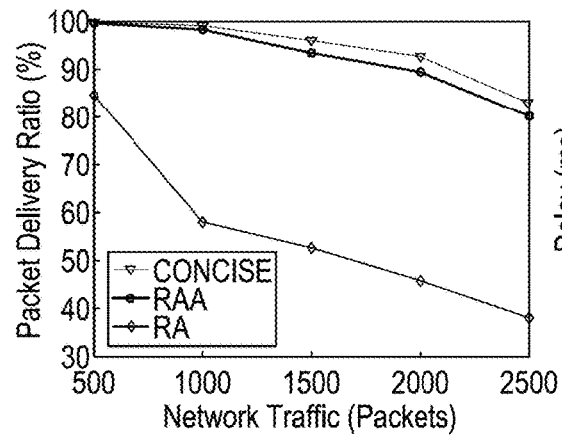
FIG. 15(a) shows the packet delivery ratio against the network traffic for the CONCISE, RA and RAA systems.
Figure 15B:
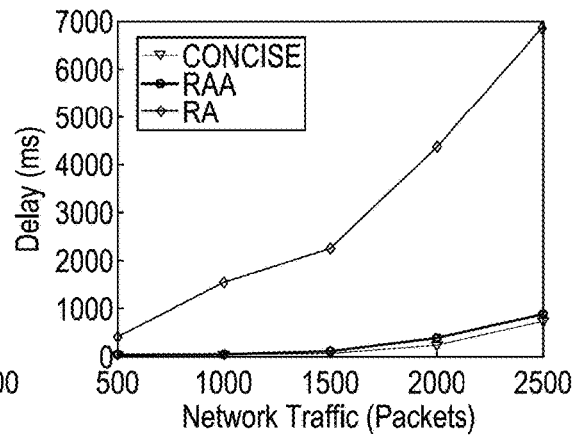
FIG. 15(b) shows the network communication latency against the network traffic for the CONCISE, RA and RAA systems.

FIGS. 15(a) and 15(b) show the packet delivery ratio and the network communication latency against the network traffic for the CONCISE, RA and RAA systems. It is clearly shown that the performance of the RA system decreases significantly with regards to both packet delivery ratio and latency as network traffic increases. On the other hand, thanks to data aggregation, the CONCISE and RAA systems handle the increased traffic better. The CONCISE system has a further 4-5% improvement in the packet delivery ratio and 20% reduction of latency compared with the RAA system.

Arrangements proposed herein provide a novel means of routing and aggregating data in a deterministic and timely manner via scheduling. Network traffic flow is differentiated by its content, hence the proposed Content Route Manager (CRM) and Content Schedule Manager (CSM) are able to provide content based overlaid routing paths and content specific schedules for both communication and data processing. The deterministic nature of the scheduling mechanism can provide latency and reliability guarantees, making it suitable for industrial applications. The proposed arrangements are standard-compliant and can be used in the latest IETF 6TiSCH standard based on the IEEE 802.15.4e TSCH MAC. Nevertheless, arrangements can also be used as a scheduling solution for any TDMA MAC based communication protocols.

Network traffic is significantly reduced as a direct benefit of content centric routing, which can help to avoid traffic congestion, reduce communication latency, reduce interference and increase communication reliability. A cross-layer interaction between the CRM and CSM can provide traffic load balancing, especially in the inner-layer of a multi-hop wireless network, hence reducing overall delays.

A content dependent immediate processing byte and content independent premium timeslot reservation mechanism offer an effective way to efficiently use processing and communication resources. Particularly, urgent messages (e.g. alarm or process failure messages) can be delivered rapidly across the network using all possible resources.

Accordingly, arrangements provide improved network efficiency, reduced communication latency and improved reliability.

ALTERNATIVE ARRANGEMENTS

Whilst the network controller in the above arrangement determines the network topology, the network topology may be determined by another device (e.g. a device in the network itself, such as the hub) and forwarded to the network controller. Equally, the network controller may form part of the network, e.g. as the hub node.

Whilst the network layers described herein are described primarily in relation to the minimum hop distance to the hub, the layers may be determined based on other criteria, such as link quality and processing capabilities. Accordingly, nodes that may not necessarily be closer to the hub may be preferentially positioned in lower layers to encourage data to be routed via them.

Whilst the network controller and nodes shown in FIG. 3 have combined input/output interfaces (input/output wireless interface in FIG. 3(b)), these interfaces may be implemented as separate input and output terminals.

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A network management device for managing transmissions over a multi-hop wireless network, the network comprising nodes wherein one or more of the nodes are configured to generate one or more messages for communication across the network, each of the messages comprising data of one of a plurality of data types, wherein messages having data of the same data type are capable of being aggregated by a node so as to reduce the number of bits required to send the data over the network, the device comprising:
   an interface configured to communicate with one or more nodes in the network; and
   a controller configured to:
      receive network information relating to the topology of nodes in the network;
      receive traffic information detailing rates that the one or more of the nodes generate messages, and the data type of the data contained in each of the generated messages;
      determine a respective routing topology for each data type based on the network information and based on the traffic information for messages of the respective data type;
      determine, for each data type, a respective multi-hop communication schedule that schedules, for each message containing the respective data type, a time for each of a sequence of transmissions from a source node for the message across the network to a central hub based on the routing topology for the respective data type and that schedules a time for each of one or more processing tasks for aggregating data of the respective data type; and send, via the interface, the multi-hop communication schedules to the network to allow the nodes to send messages according to the multi-hop communication schedules.

2. The device of claim 1 wherein:

the network comprises a hub node;

messages are transmitted via a number of communications links between nodes in order to be sent to the hub node;

the network comprises a number of layers based on the number of communications links between the nodes and the hub node; and determining, for each data type, a respective routing topology comprises for each node in each layer assigning a communications link between the node and a relay node selected from a plurality of neighbouring candidate nodes that are one layer closer to the hub node than the node, wherein the relay node is selected based on the number of nodes neighbouring each candidate node that receive, transmit and/or aggregate data of the respective data type.

3. The device of claim 2 wherein the relay node is determined to be the candidate node that has the most neighbouring nodes that receive, transmit and/or aggregate data of the respective data type.

4. The device of claim 1 wherein the controller is configured to, for each data type:

determine, based on the routing topology for the respective data type, one or more aggregation nodes for aggregating data of the respective data type; and determine data rates across communication links in the routing topology, wherein the data rates are determined based on the routing topology for the respective data type and the one or more aggregation nodes for the respective data type; and wherein determining, for each data type, a respective multi-hop communication schedule comprises scheduling one or more processing tasks for each of the aggregation nodes for the respective data type.

5. The device of claim 1 wherein the controller is further configured to, for each data type:

determine a bottleneck node in the network based on the schedule for the respective data type;

determine a new routing topology that reduces the number of scheduled transmissions and/or processing tasks assigned to the bottleneck node; and determine a new schedule based on the new routing topology.

6. The device of claim 5 wherein the bottleneck node is determined based on the number of scheduled transmissions and/or processing tasks assigned to each node in the network.

7. The device of claim 5 wherein the controller is configured to determine whether the new schedules provide a shorter overall schedule than the multi-hop communication schedules and, if so, update the multi-hop communication schedules to reflect the new schedules.

8. The device of claim 5 wherein determining a new routing topology comprises reassigning one or more communication links from the bottleneck node of one of the data types to a different node.

9. The device of claim 8, when dependent on claim 3, wherein the different node is the candidate node with the next highest number of neighbouring nodes that transmit and/or aggregate data of the respective data type.

10. The device of claim 1 wherein each multi-hop communication schedule assigns one or more priority transmission timeslots in which time critical messages take priority.

11. The device of claim 1 wherein the multi-hop communication schedules are suitable for use with time slotted channel hopping medium access control.

12. A system comprising the device and network of claim 1.

13. A method for managing transmissions over a multi-hop wireless network, the network comprising nodes wherein one or more of the nodes are configured to generate one or more messages for communication across the network, each of the messages comprising data of one of a plurality of data types, wherein messages having data of the same data type are capable of being aggregated by a node so as to reduce the number of bits required to send the data over the network, the method comprising a network management device:

receiving network information relating to the topology of nodes in the network;

receiving traffic information detailing rates the one or more of the nodes generate messages, and the data type of the data contained in each of the generated messages;

determining a respective routing topology for each data type based on the network information and based on the traffic information for messages of the respective data type;

determining, for each data type, a respective multi-hop communication schedule that schedules, for each message containing the respective data type, a time for each of a sequence of transmissions from a source node for the message across the network to a central hub based on the routing topology for the respective data type and that schedules a time for each of one or more processing tasks for aggregating data of the respective data type; and sending, via the interface, the multi-hop communication schedules to the network to allow the nodes to send messages according to the multi-hop communication schedules.

14. The method of claim 13 wherein:

the network comprises a hub node;

messages are transmitted via a number of communications links between nodes in order to be sent to the hub node;

the network comprises a number of layers based on the number of communications links between the nodes and the hub node; and determining, for each data type, a respective routing topology comprises for each node in each layer assigning a communications link between the node and a relay node selected from a plurality of neighbouring candidate nodes that are one layer closer to the hub node than the node, wherein the relay node is selected based on the number of nodes neighbouring each candidate node that receive, transmit and/or aggregate data of the respective data type.

15. The method of claim 14 wherein the relay node is determined to be the candidate node that has the most neighbouring nodes that receive, transmit and/or aggregate data of the respective data type.

16. The method of claim 13 wherein the method comprises, for each data type:

determining, based on the routing topology for the respective data type, one or more aggregation nodes for aggregating data of the respective data type; and determining data rates across communication links in the routing topology, wherein the data rates are determined based on the routing topology for the respective data type and the one or more aggregation nodes for the respective data type; and wherein determining, for each data type, a respective multi-hop communication schedule comprises scheduling one or more processing tasks for each of the aggregation nodes for the respective data type.

17. The method claim 13 wherein the method further comprises, for each data type:

determining a bottleneck node in the network based on the schedule for the respective data type;

determining a new routing topology that reduces the number of scheduled transmissions and/or processing tasks assigned to the bottleneck node; and determining a new schedule based on the new routing topology.

18. The method of claim 17 wherein the bottleneck node is determined based on the number of scheduled transmissions and/or processing tasks assigned to each node in the network.

19. The method of claim 18 wherein the method further comprises determining whether the new schedules provide a shorter overall schedule than the multi-hop communication schedules and, if so, updating the multi-hop communication schedules to reflect the new schedules.

20. The method of claim 17 wherein determining a new routing topology comprises reassigning one or more communication links for a data type from the bottleneck node of one of the data types to a different node.

21. The method of claim 20, when dependent on claim 15, wherein the different node is the candidate node with the next highest number of neighbouring nodes that transmit and/or aggregate data of the respective data type.

22. The method of claim 13 wherein each multi-hop communication schedule assigns one or more priority transmission timeslots in which time critical messages take priority.

23. A non-transitory computer readable medium comprising computer executable instructions which, when executed by a network management device, causes the network management device to perform a method in accordance with claim 13.

* * * * *